(12) United States Patent
Kong et al.

(10) Patent No.: US 12,299,462 B2
(45) Date of Patent: May 13, 2025

(54) SYSTEMS AND METHODS FOR INTERACTIVE PRESENTATIONS

(71) Applicant: Canva Pty Ltd, Surry Hills (AU)

(72) Inventors: Ho Wai Anthony Kong, Surry Hills (AU); Ashwanth Fernando, Baulkham Hills (AU); Rob Kawalsky, Surry Hills (AU); Samuel Enoka, Sydney (AU); Vladimirs Katusenoks, Surry Hills (AU)

(73) Assignee: Canva Pty Ltd, Surry Hills (AU)

( * ) Notice: Subject to any disclaimer, the term of this patent is extended or adjusted under 35 U.S.C. 154(b) by 0 days.

(21) Appl. No.: 17/927,882

(22) PCT Filed: May 26, 2021

(86) PCT No.: PCT/AU2021/050501
§ 371 (c)(1),
(2) Date: Nov. 26, 2022

(87) PCT Pub. No.: WO2021/237286
PCT Pub. Date: Dec. 2, 2021

(65) Prior Publication Data
US 2023/0205552 A1    Jun. 29, 2023

(30) Foreign Application Priority Data
May 26, 2020   (AU) ................................ 2020901701

(51) Int. Cl.
*G06F 9/451*     (2018.01)
*G06F 3/0483*    (2013.01)
(Continued)

(52) U.S. Cl.
CPC ............ *G06F 9/451* (2018.02); *G06F 3/0483* (2013.01); *G06F 3/0484* (2013.01);
(Continued)

(58) Field of Classification Search
CPC ...... G06F 16/4393; G06F 9/451; G06F 3/165; G06F 2203/04803
See application file for complete search history.

(56) References Cited

U.S. PATENT DOCUMENTS 8,433,178 B2    4/2013  Ikeda et al.
9,092,533 B1 *  7/2015  Demathieu ......... G06F 16/9562
(Continued)

FOREIGN PATENT DOCUMENTS

WO    2013088760 A1    6/2013
WO    2015077894 A1    6/2015

OTHER PUBLICATIONS

"How to use Loom Video Recorder," https://www.youtube.com/watch?v=3PY6v9s1MU8, Reported as uploaded on Jun. 13, 2018.
(Continued)

*Primary Examiner* — Andrea C Leggett
(74) *Attorney, Agent, or Firm* — GrowIP Law Group LLC

(57) ABSTRACT

Described herein is a computer implemented method for providing participant interactions in a presentation session. The method comprises receiving, over the course of the presentation session, a plurality of a user interaction messages from one or more participant client applications, each user interaction message being in respect of a user interaction. For each user interaction message received, a corresponding interaction record is written to an in-memory database transaction log. Over the course of the presentation session, a presenter polling process is periodically performed. Each presenter polling process comprises retrieving new user interaction records from the in memory database transaction log and communicating the new user interaction records retrieved from the in memory database transaction log to a presenter client application.

20 Claims, 9 Drawing Sheets

(51) Int. Cl.
  *G06F 3/0484* (2022.01)
  *G06F 3/04842* (2022.01)
  *G06F 3/16* (2006.01)
  *G06F 16/438* (2019.01)

(52) U.S. Cl.
  CPC .......... *G06F 3/04842* (2013.01); *G06F 3/165* (2013.01); *G06F 16/4393* (2019.01); *G06F 2203/04803* (2013.01)

(56) References Cited

U.S. PATENT DOCUMENTS

| | | | |
|---|---|---|---|
| 2007/0171192 | A1 | 7/2007 | Seo et al. |
| 2008/0126943 | A1 | 5/2008 | Parasnis et al. |
| 2009/0059094 | A1 | 3/2009 | Yi et al. |
| 2011/0161834 | A1 | 6/2011 | Shadfar et al. |
| 2012/0296914 | A1 | 11/2012 | Romanov et al. |
| 2014/0033073 | A1 | 1/2014 | Pegg |
| 2014/0123014 | A1 | 5/2014 | Keen |
| 2014/0218370 | A1 | 8/2014 | Mishra et al. |
| 2016/0191975 | A1 | 6/2016 | Ju |
| 2017/0279862 | A1 | 9/2017 | Bader-Natal et al. |
| 2018/0358049 | A1 | 12/2018 | Latulipe et al. |
| 2019/0073640 | A1* | 3/2019 | Udezue .............. G06Q 10/1095 |
| 2019/0268348 | A1 | 8/2019 | Miller et al. |
| 2020/0204880 | A1 | 6/2020 | Viswanathan |
| 2021/0058264 | A1* | 2/2021 | Fahrendorff ........ H04L 12/1822 |

OTHER PUBLICATIONS

Bederson et al., Experiencing the International Children's Digital Library, interactions 15, 6 (Nov. + Dec. 2008), pp. 50-54.

Bederson et al., Implementing a zooming user interface: experience building Pad++, Software: Practice and Experience, vol. 28(10), pp. 1101-1135, Aug. 1998.

Bederson et al., Jazz: an extensible zoomable user interface graphics toolkit in Java, In Proceedings of the 13th annual ACM symposium on User interface software and technology (UIST 2000), Association for Computing Machinery, New York, NY, USA, pp. 171-180.

Bly et al., A comparison of Tiled and Overlapping Windows, CHI, pp. 101-106, Apr. 1986.

Bonsignore et al., Sharing Stories "in the Wild": A Mobile Storytelling Case Study Using StoryKit, ACM Transactions on Computer-Human Interaction, vol. 20, No. 3, pp. 18-38, Jul. 2013.

Druin et al., KidPad: A Design Collaboraiton Between Children, Technologists, and Educators, CHI, pp. 463-470, Mar. 22-27, 1997.

Eric Kasten, HTML: A Gentle Introduction, Linux J., 1995, 15es, Article 3 (Jul. 1995).

Good et al., Zoomable user interfaces as a medium for slide show presentations, Information Visualisation, pp. 35-49, 2002.

Kizilcec et al., Showing Face in Video Instruction: Effects on Information Retention, Visual Attention, and Affect, CHI 2014 (Entire Document).

Krosnick, VideoDoc: Combining Videos and Lecture Notes for a Better Learning Experience, pp. 1-93, 2015.

Quinn et al., Readability of scanned books in digital libraries, In Proceedings of the SIGCHI Conference on Human Factors in Computing Systems, CHI 2008, Association for Computing Machinery, New York, NY, USA, pp. 705-714.

Written Opinion of the International Search Authority for PCT/AU2021/050501 mailed Jun. 29, 2021.

Written Opinion of the International Search Authority for PCT/AU2021/050502 mailed Jul. 27, 2021.

* cited by examiner

SYSTEMS AND METHODS FOR INTERACTIVE PRESENTATIONS

CROSS-REFERENCE TO RELATED APPLICATIONS

This application is a U.S. National Stage Application that claims the benefit of the filing date of International PCT Application No. PCT/AU2021/050501, filed on May 26, 2021, that claims priority to Australian Patent Application No. 2020901701, filed May 26, 2020, that are hereby incorporated by reference in their entirety.

FIELD

The present disclosure is directed to systems and methods for interactive presentations.

BACKGROUND

For many years, computer aided presentation tools have been used to assist in delivering presentations.

Initially, and generally speaking, such presentation tools involved software and hardware which could be used by a presenter to supplement their presentation with visual and/or audio content. In this case a presenter would present directly to an audience, referring to visual and/or audio aids provided by the presentation tool and appropriate audio visual hardware (e.g. a projector and speaker system or the like).

Such tools have evolved to platforms that allow presentations to be streamed to individual user computers—e.g. video and/or audio of the presenter's actual presentation along with any supplemental audio and/or visual content. Some presentation tools even allow for certain participant interactions to be performed via the participant and presenter's computing devices.

A significant challenge that exists with such platforms, however, is one of scalability: i.e. providing a presentation platform that can support multiple simultaneous presentations, each presentation potentially being delivered to a large number of participants.

Background information described in this specification is background information known to the inventors. Reference to this information as background information is not an acknowledgment or suggestion that this background information is prior art or is common general knowledge to a person of ordinary skill in the art.

SUMMARY

Described herein is a computer implemented method for providing participant interactions in a presentation session, the method comprising: over the course of the presentation session, receiving a plurality of a user interaction messages from one or more participant client applications, each user interaction message being in respect of a user interaction; for each user interaction message received, writing a corresponding interaction record to an in-memory database transaction log; over the course of the presentation session, periodically performing a presenter polling process, each presenter polling process comprising: retrieving new user interaction records from the in memory database transaction log; and communicating the new user interaction records retrieved from the in memory database transaction log to a presenter client application.

Figure 1:
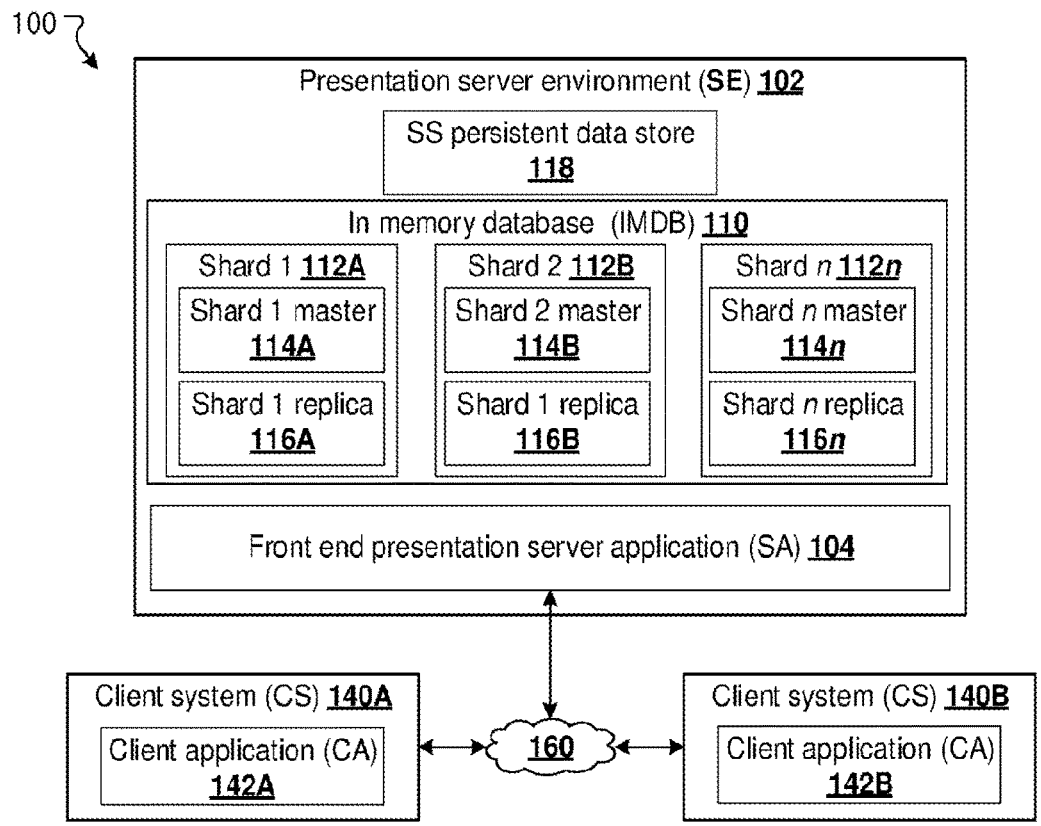
FIG. 1 is a diagram depicting a networked environment in which various features of the present disclosure may be implemented.

While the invention as claimed is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the scope of the present invention as defined by the appended claims.

DETAILED DESCRIPTION OF THE EMBODIMENTS

In the following description numerous specific details are set forth in order to provide a thorough understanding of the claimed invention. It will be apparent, however, that the claimed invention may be practiced without these specific details. In some instances, well-known structures and devices are shown in block diagram form in order to avoid unnecessary obscuring.

The present disclosure is directed to an interactive presentation platform. Generally speaking, the interactive presentation platform allows a presenter to deliver a presentation via his or her device to one or more participant devices. The presentation platform of the present disclosure permits various interactions to be performed by participants throughout a presentation session.

Generally speaking, facilitating user interactions that occur in a given presentation involves generating, storing, and communicating user interaction data. Example user interactions are described in detail below, but may include, for example, interactions such as comments, reactions, polls, and/or other interactions.

User interaction data in the present disclosure is distinct to other (or non-user interaction) presentation data. Non-user interaction presentation data may include for example, audio and/or visual data generated by a presenter while giving a presentation—e.g. audio data generated from a presenter's spoken words, video of a presenter during the presentation, data tracking a presenter's cursor as he/she moves a cursor around a screen shared during the presentation, and/or other audio/visual data generated by a presenter while giving a presentation.

Non-user interaction presentation data may also include supplemental presentation—e.g. content that has been prepared for, and presented during, a presentation. For example, if a presenter prepares a slide show which they show during their presentation, the slide show is supplemental data. As another example, if a presenter plays a particular audio of video file during a presentation, that audio or video file is supplemental data.

In certain embodiments, the present disclosure also provides for the persistent storage of interaction data. In this case, the persistently stored interaction data can used with other data recorded for the presentation (e.g. non-user interaction presentation data) to generate a faithful replay of the presentation as originally delivered.

In this context, a faithful presentation replay is one in which interaction and non-interaction data are synchronised so that in the presentation replay any user interactions are presorted at the time they occurred in the original presentation. For example, if at time x in an original presentation a presenter is speaking specific words (non-interaction presentation data), switches from slide A to slide B (non-interaction presentation data), and a participant submits a comment-type interaction (interaction data) which causes a comment to be displayed on the presenter's user interface, in any replay of that presentation those three events are synchronised and replayed as they occurred in the original presentation.

Recording/storing non-user interaction presentation data can be performed in various ways, and is not described in detail herein. Generally speaking, however, non-user interaction presentation data may include an audio and/or video recording of a presenter and (if used) a copy of (or reference to) any supplemental presentation content with relevant event timestamps (e.g. timestamps at which particular content was shown, slides were transitioned, etc.). Non-user interaction presentation data can be persistently stored, for example, in a relational database management system.

Turning to FIG. 1, a networked environment 100 will be described in which the various operations and techniques described herein can be performed.

Networked environment 100 includes a presentation server environment 102 (SE 102 for short) which connects to a plurality of client systems 140 (CS 140 short) via one or more communications networks 160 (e.g. the Internet). Generally speaking, the presentation server environment (SE 102) provides server-side functionality for interactive presentations. This functionality is described in detail below, however can include delivering presentations that involve participant interactions and/or replaying previously delivered presentations that involved participant interactions.

While various architectures are possible, SE 102 in the present example is a scalable system in which resources (e.g. compute nodes) are commissioned and decommissioned according to demand—e.g. in a public or private cloud-type system.

The various functions performed by the SE 102 are described as being performed by applications. The function of a given application may be provided by a single compute node (or computer processing system) or several compute nodes (or computer processing systems). Furthermore, in some cases the function provided by a given application could be provided by one or more alternative applications, and/or that the functionality described as being provided across multiple applications could be performed by a single application.

SE 102 includes a front-end presentation server application (or service) 104 (SA 104 for short). The SA 104 is executed by a computer processing system to configure that system to provide server-side functionality to one or more corresponding client applications (e.g. client applications 140 described below).

In addition to the specific functionality described below, the server-side functionality provided by SA 104 (alone or in conjunction with other applications) can include typical functions provided by a server system—for example user account creation and management, user authentication, and the like.

SA 104 also provides general presentation functionality: i.e. functionality that allows a presenter to prepare and deliver a presentation (via the presenter's computing system) which other participants can (via their computer systems) view and participate in.

To provide the server-side functionality, the SA 104 comprises one or more application progams, libraries, APIs or other software elements that implement the features and functions that are described herein. For example, where a given client application 142 (described below) is a web browser, the SA 104 will be a web server such as Apache, IRS, nginx, GWS, or an alternative web server. Where a client application 142 is a native or dedicated application, the SA 104 will be an application server configured specifically to interact with that client application 142. SE 102 may be provided with both web server and application server applications allowing it to interact with both web and native/dedicated clients.

As discussed below, in order to facilitate user interactions presenters connect to the SE 102 via a streaming connection. In some cases participants may also connect via a streaming connection. In certain implementations such connections can be handed by the server application 104. In alternative implementations, a streaming connection may be provided by a separate streaming front-end service that a client application connects directly to.

In the present example, SE 102 also includes an in-memory data base 110 (IMDB 110 for short). Generally speaking, the IMDB 110 is used to facilitate participant interaction during a presentation session. Further detail regarding the IMDB 110 is described below.

In the present example, SE 102 also includes a persistent data store 118. The persistent data store 118 is used to persistently store various data generated and/or used by SE 102 in the course of its operations. This can include, for example, data in respect of users/user accounts, supplemental presentation data (e.g. presentation side shows and/or other supplemental audio/visual presentation data), and recorded presentation data. As described in more detail below, the persistent data store 118 is, in certain embodiments, used to persistently store presentation interaction data to allow presentations to be replayed in a way that includes any interactions that occurred when a presentation was originally delivered.

In order to provide server side functionality to clients, SE 102 will typically include additional applications to those illustrated and described. As one example, SE 102 may include a load balancing type application which can operate to determine demand, direct client traffic to the appropriate front end presentation server application 104 (where multiple server applications 104 have been commissioned), trigger the commissioning of additional server (and/or other) applications if required to meet the current demand, and/or trigger the decommissioning of server (and/or other) applications if they are not functioning correctly and/or are not required for current demand.

The functionality of the SE 102 applications described herein may be provided by hardware, software, or a combination of hardware and software. The precise hardware architecture of SE 102 will vary depending on implementation, however it will typically include multiple computer processing systems (e.g. server systems) which communicate with one another either directly or via one or more networks—e.g. one or more LANS, WANs, or other networks (with a secure logical overlay, such as a VPN, if required).

A client system 140 hosts a client application 142 (CA 142 for short). When executed, the client application 142 configures the client system 140 to provide client-side functionality.

The client-side functionality provided by the CA 142 is described further below. Generally speaking, however, client-side functionality includes causing the client system 140 to output datainformation, e.g. via a display, speaker, or other output device. Such data/information may include data/information generated by the CA 142 itself, and/or data/information received from (or generated based on data received from) from the SE 102. Client-side functionality also generally includes receiving and processing user inputs from various input devices (e.g. touch screen, keyboard, mouse, or other input device). User inputs are typically received by the CA 142 via an operating system or other application running on the client device 140. Client-side functionality also generally includes communicating data to the SE 102, e.g. data input by a user and/or data generated by the CA 142 based on data input by a user.

CA 142 may be a general web browser application (such as Chrome, Safari, Internet Explorer, Opera, or an alternative web browser application) which accesses the SA 104 via an appropriate uniform resource locator (URL) and communicates with SA 104 via general world-wide-web protocols (e.g. http, https, ftp). Alternatively, CA 142 may be a native application programmed specifically to communicate with SA 104 using defined application programming interface (API) calls.

A client system 140 may host both a web browser client application and a native application.

In terms of hardware, client system 140 may be any computer processing system which is configured (or configurable) by hardware and/or software to offer client-side functionality. By way of example, CS 140 may be a desktop computer, a laptop computer, a netbook computer, a tablet computing device, a mobile/smart phone device, a personal digital assistant, or an alternative computer processing system.

Although not illustrated in FIG. 1, client system 140 will typically have additional applications installed thereon, for example an operating system application such as Microsoft Windows®, Apple SSX, Apple RSS, Android, Unix, or Linux.

FIG. 1 depicts two client systems CS 140A and CS 140B, respectively hosting client applications 142A and 142B. In the examples described herein, and for ease of distinction: client system 140A is operated by a presenter—i.e. the user is a presenter for a particular presentation and, accordingly, client application 142A is in a presenter mode of operation; client system 140B is operated by a participant—i.e. the user is an audience member for a particular presentation and, accordingly, client application 142B is in a participant mode of operation.

Client applications 142A and 142B are the same application in the present example (albeit installed on two separate systems, 140A and 140B respectively). In this case, the client application provides different functionality based on the mode of operation: i.e. whether the application connects to the SE 102 as a presenter (invoking the presenter mode of operation) or a participant (invoking the participant mode of operation). In this way a given user may (using the same application) be a participant in some presentations and a presenter in others.

In alternative implementations, separate presenter and participant client applications may be provided/installed on a given users system.

While only two client systems are depicted, the presentation server environment 102 will typically serve many more client systems (and client applications)—thousands or even tens/hundreds of thousands. Furthermore, a given presentation may involve multiple presenters (i.e. multiple client applications that are connected and operating in a presenter mode, such as 142A) and multiple participants (i.e. multiple client applications that are connected and operating in a participant mode, such as 142B).

Various features and techniques described herein are implemented using one or more computer processing systems.

For example, in networked environment 100 described above, each client 140 is a computer processing system (for example, a personal computer, tablet/phone device, or other computer processing system).

The various functions of the server environment 102 are also provided by one or more computer processing systems (e.g. server computers or other computer processing systems). For example, where SE 102 is a scalable system, multiple front end server applications 104 may be operational, each running on a compute node which, in turn, will be running on one or more physical computer systems. As a further example, the persistent data store 118 may run on its own computer system (or group of computer systems) which includes (for example) a database server in communication with one or more storage devices. Still further, each IMDB shard master 114 (and shard replica 116) may run on its own computer system.

Figure 2:
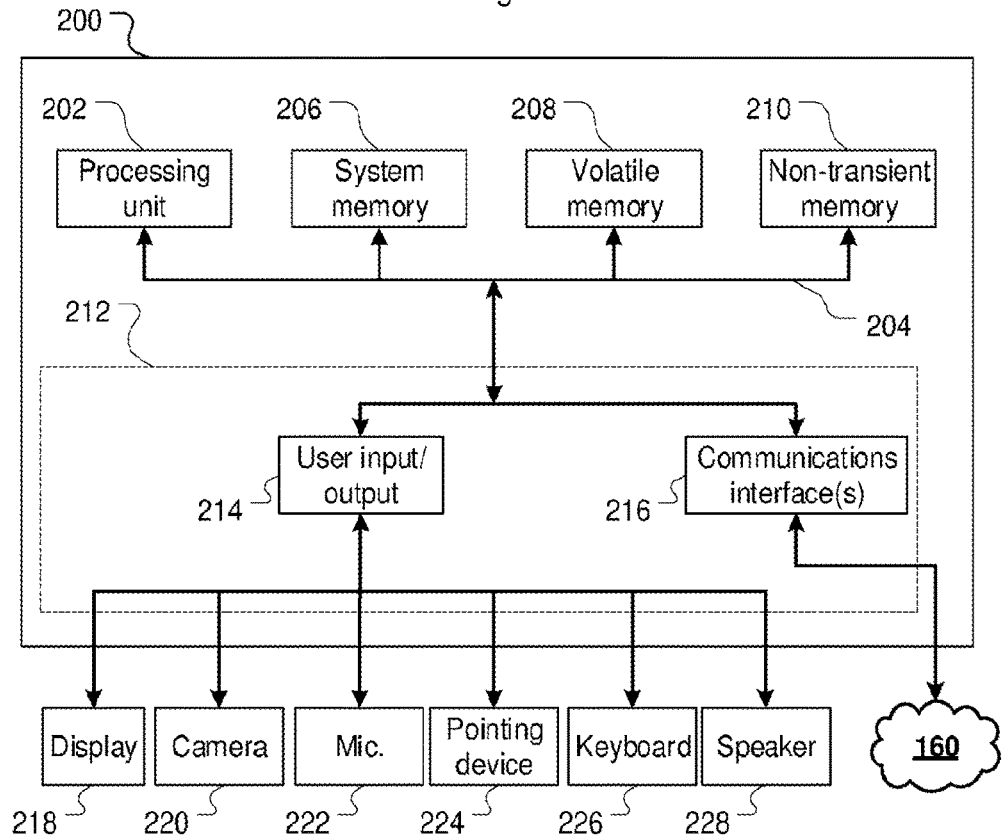
FIG. 2 is a block diagram of a computer processing system configurable to perform various features of the present disclosure.

FIG. 2 provides a block diagram of a computer processing system 200 configurable to implement embodiments and/or features described herein. System 200 is a general purpose computer processing system. It will be appreciated that FIG. 2 does not illustrate all functional or physical components of a computer processing system. For example, no power supply or power supply interface has been depicted, however system 200 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

Computer processing system 200 includes at least one processing unit 202. The processing unit 202 may be a single computer processing device (e.g. a central processing unit, graphics processing unit, or other computational device), or may include a plurality of computer processing devices. In some instances, where a computer processing system 200 is described as performing an operation or function all processing required to perform that operation or function will be performed by processing unit 202. In other instances, processing required to perform that operation or function may also be performed by remote processing devices accessible to and useable by (either in a shared or dedicated manner) system 200.

Through a communications bus 204 the processing unit 202 is in data communication with a one or more machine readable storage (memory) devices which store instructions and/or data for controlling operation of the processing system 200. In this example system 200 includes a system memory 206 (e.g. a BIOS), volatile memory 208 (e.g. random access memory such as one or more DRAM modules), and non-volatile memory 210 (e.g. one or more hard disk or solid state drives).

System 200 also includes one or more interfaces, indicated generally by 212, via which system 200 interfaces with various devices and/or networks. Generally speaking, other devices may be integral with system 200, or may be separate. Where a device is separate from system 200, connection between the device and system 200 may be via wired or wireless hardware and communication protocols, and may be a direct or an indirect (e.g. networked) connection.

Wired connection with other devices/networks may be by any appropriate standard or proprietary hardware and connectivity protocols. For example, system 200 may be configured for wired connection with other devices/communications networks by one or more of USB; FireWire; eSATA; Thunderbolt; Ethernet; SS/2; Parallel; Serial; HDMI; DVI; VGA; SCSI; AudioPort Other wired connections are possible.

Wireless connection with other devices/networks may similarly be by any appropriate standard or proprietary hardware and communications protocols. For example, system 200 may be configured for wireless connection with other devices/communications networks using one or more of infrared; BlueTooth; WiFi; near field communications (NFC); Global System for Mobile Communications (GSM), Enhanced Data GSM Environment (EDGE), long term evolution (LTE), wideband code division multiple access (W-CDMA), code division multiple access (CDMA). Other wireless connections are possible.

Generally speaking, and depending on the particular system in question, devices to which system 200 connects—whether by wired or wireless means—include one or more input devices to a low data to be input into/received by system 200 for processing by the processing unit 202, and one or more output device to allow data to be output by system 200. Example devices are described below, however it will be appreciated that not all computer processing systems will include all mentioned devices, and that additional and alternative devices to those mentioned may well be used.

For example, system 200 may include or connect to one or more input devices by which information/data is input into (received by) system 200. Such input devices may include keyboards, mice, trackpads, microphones, accelerometers, proximity sensors, GPS devices and the like. System 200 may also include or connect to one or more output devices controlled by system 200 to output information. Such output devices may include devices such as a CRT displays, LCD displays, LED displays, plasma displays, touch screen displays, speakers, vibration modules, LEDs/other lights, and such like. System 200 may also include or connect to devices which may act as both input and output devices, for example memory devices (hard drives, solid state drives, disk drives, compact flash cards, SD cards and the like) which system 200 can read data from and/or write data to, and touch screen displays which can both display (output) data and receive touch signals (input).

By way of example, where system 200 is a client system such as 130 it may include a display 218 (which may be a touch screen display), a camera device 220, a microphone device 222 (which may be integrated with the camera device), a pointing device 224 (e.g. a mouse, trackpad, or other pointing device), a keyboard 226, and a speaker device 228.

System 200 also includes one or more communications interfaces 216 for communication with a network, such as network 160 of environment 100 (and/or a local network within the SE 102). Via the communications interface(s) 216 system 200 can communicate data to and receive data from networked devices, which may themselves be other computer processing systems.

System 200 may be any suitable computer processing system, for example, a server computer system, a desktop computer, a laptop computer, a netbook computer, a tablet computing device, a mobile/smart phone, a personal digital assistant, or an alternative computer processing system.

System 200 stores or has access to computer applications (also referred to as software or programs)—i.e. computer readable instructions and data which, when executed by the processing unit 202, configure system 200 to receive, process, and output data. Instructions and data can be stored on non-transient machine readable medium accessible to system 200. For example, instructions and data may be stored on non-transient memory 210. Instructions and data may be transmitted to/received by system 200 via a data signal in a transmission channel enabled (for example) by a wired or wireless network connection over an interface such as communications interface 218.

Applications accessible to system 200 will typically include an operating system application such as Microsoft Windows®. Apple SSX, Apple RSS, Android, Unix, or Linux.

System 200 also stores or has access to applications which, when executed by the processing unit 202, configure system 200 to perform various computer-implemented processing operations described herein. For example, and referring to the networked environment of FIG. 100 above, server environment 102 includes (inter alia) a front end presentation server application 104 and client system 140 includes a client application 142.

In some cases part or all of a given computer-implemented method will be performed by system 200 itself, while in other cases processing may be performed by other devices in data communication with system 200.

In order to facilitate participant interactions, the SE 102 maintains various data regarding presentation sessions.

As described below, during a presentation session the SE 102 maintains certain presentation session data in the IMDB 110. This will be referred to as IMDB presentation session data.

The specific data maintained, and data structures used to do so, will depend on various factors, including the particular implementation and what user interactions are catered for. Recognising that many variations are possible, however, this section provides example data and data structures.

In the present example, the IMDB presentation session data includes presentation session metadata, participant data, participant session data, interaction log data, PIN to presentation session lookup data, and presentable to presentation session lookup data. Each of these is described below.

In the present example, the SE 102 maintains presentation session metadata in respect of each presentation session that is active. In the Redis example, presentation session metadata may be maintained in a HASH data structure, e.g. as follows:

```
HASH sip:{session_id}:meta (
    session_id: string, // a GUID to uniquely identify an active presentation session
    presenter: string, // Identity of the presenter
    presentable: string, // Identifier of presentation content (e.g.supplemental content).
    pin: string, // Access Code (e.g. a PIN)
    start_timestamp: numeral // Timestamp of the start of the presentation session.
}
```

In this example, a Presentable identifier is provided to identify supplemental content being used in a presentation. As described further below, the Presentable identifier may identify a single content item (e.g. a design, document, or other content item) or may identify a plurality of content items (e.g. an identifier of a folder or playlist, the folder/playlist in turn comprising or referring to multiple content items).

Example session metadata records are as follows:

| Key | session_id | presenter | presentable | pin | start_timestamp |
|---|---|---|---|---|---|
| sip:{8B5D638D-2858-4A69-8430-5CA03235768E}:meta | 8B5D638D-2858-4A69-8430-5CA03235768E | U1234@B1234 | D1234 | 4567 | 1553171306226 |
| sip:{91EA5982-FB50-4E36-AE8E-DE1E949E53A7}:meta | 91EA5982-FB50-4E36-AE8E-DE1E949E53A7 | U2345@B2345 | D2345 | 5678 | 1558901305219 |

In order to track participants for a given presentation session, the SE 102 also maintains session participant data—i.e. data in respect of the participants involved in each active presentation session.

In the Redis example, participant data can be stored in a sorted set (ZSET) data structure, e.g. as follows:

```
ZSET sip:{session_id}:participants (
    // a list of unique participant IDs and their corresponding scores
)
```

In this example, each active session has a list of participant records associated with it. Each participant record includes an identifier of the participant and a timestamp of the last time the participant polled the session (described below).

The participant data structure of the present example is populated by calling the ZADD method to register a participant and the timestamp. E.g.:
ZADD SESSION_ID<TIMESTAMP><PARTICIPANT_ID>

Example participant data records are as follows:

| Key | Value |
|---|---|
| sip:{8B5D638D-2858-4A69-8430-5CA03235768E}:participants | {964911384:1584371767, 955551184:1584371887, 97561314:1584371887, 964915234:1584370699} |
| sip:{91EA5982-FB50-4E36-AE8E-DE1E949E53A7}:participants | {964911354:1584370620, 955555714:1584370272} |

In this example, therefore, 964911384 is a participant ID and 1584371767 is the timestamp of that participant's most recent server poll.

In the examples described herein, the set of participants only expands during a session: new participants who join the session are added, however participants who leave the session are not removed.

As discussed below, in certain embodiments the SE 102 permits anonymous users to participate in a presentation session (i.e. users that do not have a user account with the SE 102), and/or non-anonymous users (i.e. users that do have a user account with the SE 102 and for which user details such as a user ID are available) to make certain interactions anonymously.

In this case, a unique participant identifier is required that does not rely on an account identifier. Such an identifier can be obtained/created in various ways, however in the present embodiments a CDI (i.e. a device ID Cookie) can be used as a participant identifier.

In alternative embodiments, the SE 102 may be configured only to allow users with user accounts to join a presentation and/or interact during a presentation, in which case a user identifier associated with a user's account may be used as the participant identifier.

In order to associate a given participant with a particular presentation session, a data structure mapping a participant identifier to a session identifier is maintained.

In the Redis context, the participant session data may, for example, be maintained as follows:

```
SET sip:<participant_id>:participantsession <session_id>
```

Example participant session data records are as follows:

| Key | Value |
|---|---|
| sip:2FB9E1D2-FF47-436A-BD84-10EACC263F33:participantsession | BEA63538-ED3D-4E6F-BA81-B4D85381F35C |
| sip:41087D86-DD93-4E71-A5F8-96D60FD30FB7:participantsession | 9509E027-4167-437D-B66A-036A3F01BD3A |

Participant interactions during a presentation session are ultimately recorded in a transaction log that will be referred to as the interaction log. Specifically, each interaction event causes an interaction record to be generated and stored. The interaction log, therefore, provides a time series of interaction events that occur in a live presentation session.

In the Redis example, the interaction log may be maintained as a STREAM data type (an append-only log data structure)—e.g. as follows:

```
STREAM sip:{session_id}:events (
    author_id string,      // unique identifier of the author of the interaction.
    author_name string,    // author name of the interaction.
    event_type string,     // Enum type of the event performed.
    content string,        // JSON representation of the content.
    timestamp numeral      // Creation time of the content.
)
```

Example transaction logs (including interaction records) for two presentation sessions are as follows:

| Key | entry_id (auto) | author_id | author_name | event_type | content | timestamp |
|---|---|---|---|---|---|---|
| sip:{8B5D638D-2858-4A69-8430-5CA03235768E}:events | 1553171306226-0 | 964911014 | Peter | ADD_COMMENT | {text: "Hello", action: "add"} | 1553171306226 |
| sip:{8B5D638D-2858-4A69-8430-5CA03235768E}:events | 1553171306227-0 | 964915234 | John | ADD_COMMENT | {text: "Hi", action: "add"} | 1553171306227 |
| sip:{8B5D638D-2858-4A69-8430-5CA03235768E}:events | 1553171306227-1 | 964911014 | Peter | DELETE_COMMENT | {id: 1553171306226-0, action: "delete"} | 1553171306227 |
| sip:{91EA5982-FB50-4E36-AE8E-DE1E949E53A7}:events | 1553171306230-0 | 955911015 | Peter | ADD_COMMENT | {text: "Hi", action: "add"} | 1553171306230 |
| sip:{91EA5982-FB50-4E36-AE8E-DE1E949E53A7}:events | 1553171306231-0 | 955911027 | Mary | ADD_COMMENT | {text: "Bye", action: "add"} | 1553171306231 |

In the present embodiment, the entry_id for a given interaction record is based on a timestamp of when the transaction was received.

Furthermore, in the present example the content of each transaction record includes both an event (or interaction) type and event (or interaction) data (e.g. text for an 'Add_comment' type interaction). The event type allows application code to deserialize the content appropriately and use the content for transformation into UI specific types. These UI types can then be sort over the network to be displayed on the presenter's screen (and/or participant screens depending on the type of interaction).

In order to allow participants to join an active presentation session using a PIN (or other access code), a PIN to presentation session lookup is maintained.

In the Redis example, a KEYVALUE data type may be used—e.g. as follows as follows:

```
KEYVALUE pin:pin {// value of the associated session_id}
```

Example PIN to presentation session lookup records are as follows:

| Key | Value |
|---|---|
| pin:123456 | 8B5D638D-2858-4A69-8430-5CA03235768E |
| pin:787878 | 91EA5982-FB50-4E36-AE8E-DE1E949E53A7 |

In order to allow a presenter's client application to lookup the relevant presentation session in the event of a disconnection, a presentable to presentation session lookup is maintained.

Generally speaking, this lookup allows a user to submit certain information which is then used to determine a presentation session identifier associated with that user. In the particular example below, the information provided by the user is a user identifier (e.g. a user name), a brand the user is associated with, and a identifier of the content being presented (i.e. the presentable ID). These three items are used to create a composite key which is then associated with the presentation session identifier.

In the Redis example, a KEYVALUE data type may be used—e.g. as follows as follows:

```
KEYVALUE user_brand_presentable:user_brand_presentable {
    // value of the associated session_id
}
```

Example presentable to presentation session lookup records are as follows:

| Key | Value |
|---|---|
| user_brand_presentable: UAAAAAAAjoe_BAAAAAAAjoe_F01234567890 | 8B5D638D-2858-4A69-8430-5CA03235768E |
| user_brand_presentable: UAAAAAAAkim_BAAAAAAAkim_F01234567890 | 91EA5982-FB50-4E36-AE8E-DE1E949E53A7 |

The IMDB presentation session data generated during a presentation session (e.g. the session metadata, participant data, interaction log data, PIN/presentation lookup data, presentable/presentation lookup data) has an associated time to live (TTL). On expiry of data's TTL that data is deleted from the IMDB 110.

The TTLs for different types of data may be set differently, however, in the embodiments described herein the same TTL is applied to all presentation data stored in the IMDB 110.

Specifically, data stored in the IMDB is initially provided with a TTL that is set to expire at n hours (e.g. n=6 or an alternative value) from the start of the presentation session that the data is associated with (determined via the session identifier and session metadata as described above).

If the creator of a given presentation session disconnects from that session, the TTL of all data associated with the session is updated to be the earlier of n hours from the start of the presentation session (as described above) or m hours (e.g. m=1 or an alternative value) from the time of presenter disconnection.

If the session creator subsequently re-connects, the TTL of all data associated with the presentation session is re-set to be n hours from the start of the presentation session.

In embodiments which facilitate the faithful replay of presentations. IMDB presentation session data is persisted to a persistent data storage means (e.g. SS persistent data store 118) prior to expiring and being deleted from the IMDB 110.

Various presentation session parameters may also be provided. These parameters will typically be maintained by the SA 104, not on the IMDB 110. Example presentation session parameters (and example default values for those parameters) are provided in the below table.

| Parameter name | Description | Example default values |
| --- | --- | --- |
| Session Hard Limit | Maximum duration of a presentation session | 6 hours |
| Session TTL after presenter connection loss | Time before a presentation session is removed after a presenter lost connection with SIP service. | 1 hour |
| Interaction API Pagination Size | | 10000 |
| Interaction API Pagination Delay | | 0 sec |
| Participant API call rate limiting | To place a limit on how frequent a participant can call the SIP APIs | 3 calls per 10 seconds (to be configured based on poll time) |
| updateParticipantStatus polling interval | The interval at which the participant calls the API updateParticipantStatus | 1 second |

A given session parameter may be fixed (i.e. only changeable by modification of the source code) or end-user changeable. In the latter case, the SIP 106 may be configured so that only certain users can change a given parameter (e.g. tenant administrators, presenters, or an alternative user type), and/or parameter bounds may be defined.

In the examples provided herein the IMDB 110 is a Redis data store, however alternative in-memory data stores could be used, for example Dynamo or Memcached (though in this case the features described herein may need to be adapted for use with an alternative IMDB).

The IMDB 110 (Redis or otherwise) can be configured in various ways.

In one implementation, a Redis duster (e.g. Cluster mode enabled in Amazon Web Services terminology) is used.

In this implementation one or more IMDB shards 112 are initially provisioned.

Each shard 112 has a shard master 114—i.e. a node that accepts both read and write requests.

Each shard also includes a shard replica 116 for redundancy (while one replica is depicted additional replicas could be provided). A given shard replica (e.g. 116A) constantly follows its master's (e.g. 114A) transactions in the same order as they occurred on the master 114. These transactions are applied on the replica 116 in real time (minus network lag and other delays). In the event that a shard master fails, the remaining replicas for that shard elect a leader to decide which will be the new shard master. Where a shard master fails, a new replica can be commissioned to replace the replica that has assumed the master role.

By way of example, For example, three shards may be initially provisioned (each with a replica), thus requiring six nodes. Depending on anticipated demand, suitable IMDB nodes (in the AWS environment) may be cache.t3.medium or cache.m5.large (which as at May 2020 have memory of 3.09 GiB and 6.38 GiB respectively).

If demand for interactive presentations exceeds the capacity provided by the initially provisioned shards, the cluster can be scaled out as required (and if demand drops shards decommissioned). Such scaling can be performed using a CloudWatch monitor type service (not shown in FIG. 1) which monitors the usage of each shard (node) and can be configured to provision a new node if the memory usage of any node exceeds a predefined threshold (e.g. 70% or an alternative threshold).

For a given session, the various IMDB data structures described above (e.g. the session metadata, participant data, interaction log, PIN/presentation lookup, Presentable/presentation lookup) are stored in a shard master 114 (and replicated to the shard's replica(s) 116).

Determining which particular shard 112 a given data record is to be stored in can be performed in various ways. In one implementation, the SA 104 is configured to determine the particular shard 112 for a given data record based on a hash of the record's key. In this case, when a data record is to be stored in the IMDB 110, the SA 104 calculates a hash of the record's key using a consistency hash algorithm. In particular, the record key is hashed on a circle which has the n current shards 112 on it. The nearest shard in the next clockwise direction is chosen for the record.

Generally speaking, consistent hashing involves mapping a node to a value amongst a set number (e.g. $2^{32}$) of individual buckets. Each key is also then mapped to the set number (e.g. $2^{32}$) of buckets, and the node closest to the bucket is used to store the value.

This mechanism allows the SA 104 (or an alternative application/service) to rebalance the IMDB cluster efficiently in case new shards need to be added and/or existing shards need to be removed. The SA 104 is kept ring aware by a service discovery mechanism (e.g. consul, etc.d, zookeeper, or an alternative service discovery mechanism).

Operations performed for a presenter to create and participate in an interactive presentation session will now be described.

Figure 3:
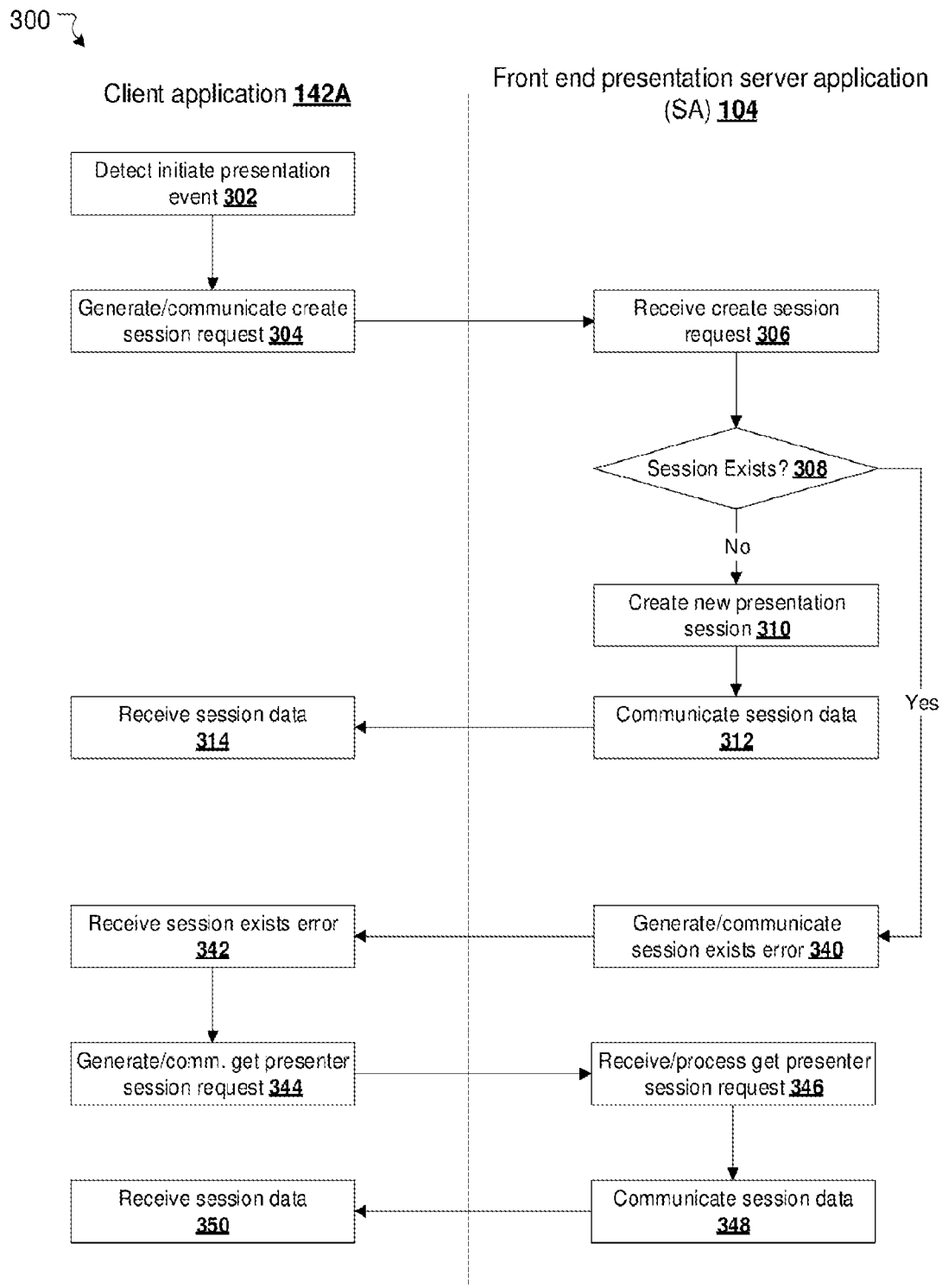
FIG. 3 depicts operations involved in creating an interactive presentation session.

Turning to FIG. 3, a process 300 for creating a new session will be described.

At 302, CA 142A detects an initiate presentation event. Various initiate presentation events are possible. For example, an initiate presentation event may be the result of a user activating an initiate presentation control displayed on client system 140A. As an alternative example an initiate presentation event may a scheduled presentation start time being reached (the scheduled presentation start time having been previously defined).

At 304, in response to detecting the initiate presentation event, CA 142A generates a create session request and communicates this to the SA 104. The create session request is associated with a presenter identifier. The presenter identifier may be a userID (or user name) of a user account the presenter has used to access the SE 102.

At 308, the SA 104 receives the create session request.

At 308, the SA 104 determines if an active session associated with the presenter already exists.

In the present embodiments, determining whether a session already exists at 308 involves determining whether the IMDB 110 has a session metadata record with a presenter identifier matching the presenter identifier associated with the create session request. If not, no active session associated with the presenter exists and processing proceeds to 310. If so processing continues to 340.

With the example Redis data structures described above, determining if a session exists for a presenter can be performed by querying the presentation session metadata maintained by the IMDB 110. An example Reds query and query result are as follows:

HGETALL sip:{8B5D638D-2858-4A69-8430-5CA0323 5768E}:meta

At 310, the SA 104 creates a new session. The new session is created with a session resource locator, a session access code, a session identifier, and a session expiry.

The session resource locator is a locator such as a URL. It is provided/made available to participants to the presentation session (and to any other presenters for the presentation session) via their client applications.

The session access code is data such as a PIN or the like which is used to provide a measure of security. The session access code is also provided/made available to participants and other presenters (via their client applications).

The session identifier is an identifier that uniquely identifies the session. In the present example, the session identifier is a GUID generated by the SA 104—for example by using UUID.randomUUID( ).toString.

With the example Redis data structures described above, in order to create a new presentation session at 310 the SA 104 creates/writes data to: the metadata to the meta data hash (e.g. the presenter identifier, the presentable (presentation content) identifier, a pin generated for the presentation session, and a start timestamp); the PIN to presentation session lookup (e.g. the PIN created for the session and session identifier); and the presentable to presentation session lookup (e.g. the composite key and presentation session identifier).

Creation of a new session will typically involve additional processing to facilitate capturing non-user interaction presentation data generated by the presenter and delivering that to participants.

At 312, the SA 104 communicates session data in respect of the session created at 310 to the CA 142A. The session data may include, for example, the session resource locator, the session access code, and the session identifier. The session data may also include the session expiry time and the participant count (which will initially be zero).

Figure 4:
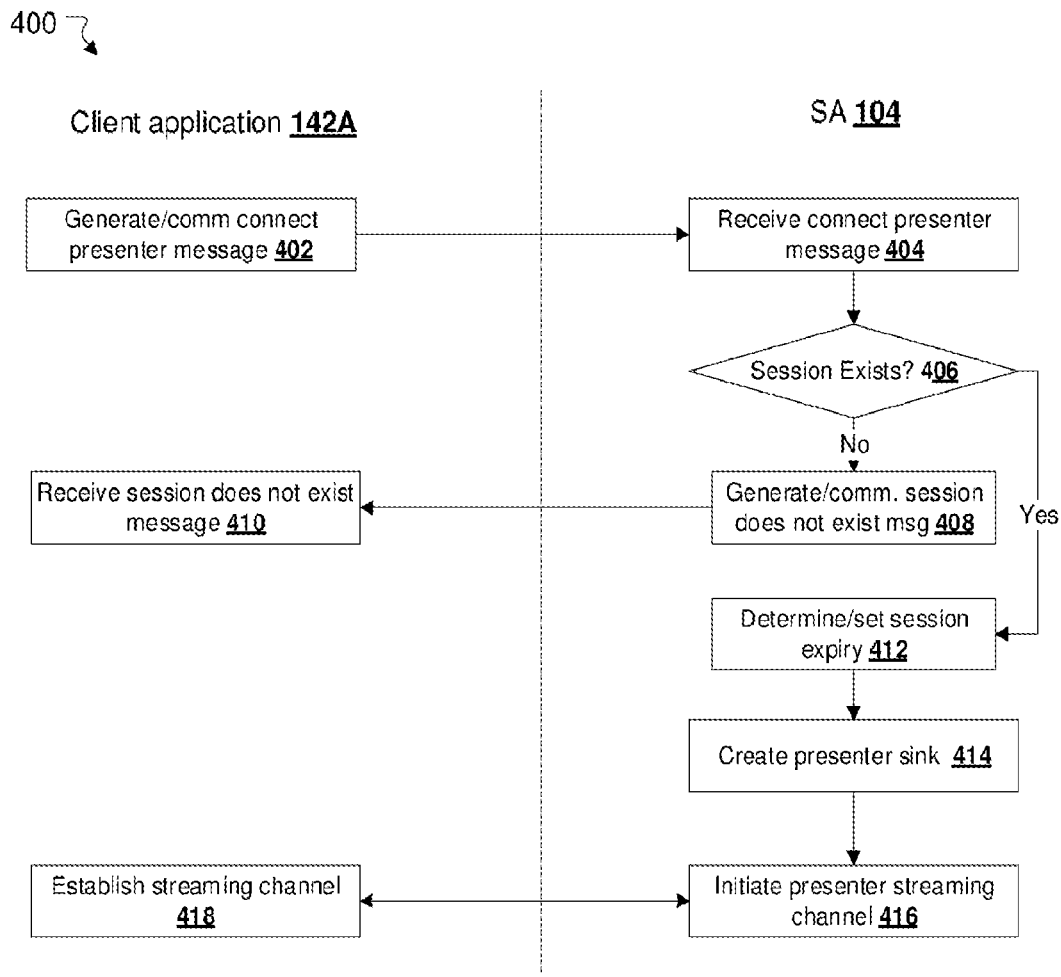
FIG. 4 depicts operations involved in a presenter connecting to an interactive presentation session.

At 314, the CA 142A receives the session data from the SA 104. CA 142A can then use the received session data connect to the session as described below with respect to FIG. 4. In addition, the session data (or parts thereof) may be communicated to other users to allow them to access the session. For example, the session resource locator and access code may be communicated via email, message service, or alternative means to intended participants, and/or displayed on the presentation so a participant who is viewing the presentation will know the URL for the presentation and access code (PIN).

If, at 308, the SA 104 determines that a session already exists, processing continues to 340. At 340, the SA 104 generates a session exists error indicating that a session associated with the presenter identifier already exists, and communicates this to the CA 142A.

At 342, the CA 142A receives the session exists error. This indicates that there has been a connection dropout from an existing session.

At 344, the CA 142A generates a get presenter session request and communicates this to the SA 104. The get presenter session request includes (or is associated with) the presenter identifier.

At 346, the SA 104 receives the get presenter session request. In order to process the request, the SA 104 determines whether an active session for the presenter exists.

At 348, the SA 104 generates a get presenter session response and communicates this to the CA 142A. The get presenter session response includes session data in respect of the existing session associated with the presenter identifier—e.g. the session identifier.

At 350, the CA 142A receives the session data from the SA 104. CA 142A can then use the received session data connect to the session as described below with respect to FIG. 4.

To further illustrate the above, examples of API calls that can be used for a presenter to create a presentation session or fetch an existing session are as follows. Alternative API calls can be used.

```
// E.g. API call to start an interactive session for the first time.(Called,
e.g., at 304)
// If presentation already started by the user for the asset, BadRequest will
be thrown.
    rpc createSession (CreateSessionRequest) returns
    (CreateSessionResponse) {
        option (google.api.http) = {
            post: "/session"
            body: "body"
        };
    }
// E.g. API call to fetch existing presenter session for the asset. (Called,
e.g., at 344)
    rpc findPresenterSession (FindPresenterSessionRequest) returns
    (FindPresenterSessionResponse) {
        option (google.api.http) = {
            get: "/session"
        };
    }
```

Example data types that can be used with the above APIs are as follows. Alternative data types can be used.

```
message CreateSessionRequest {
    required Presentable presentable = 1; // Resource associated with
    presentation.
}
message CreateSessionResponse {
    required PresenterSession session = 1;
}
message FindPresenterSessionRequest {
    required Presentable presentable = 1;
}
message FindPresenterSessionResponse {
    optional PresenterSession session = 1; // will be empty if no session
was
    found.
}
// Resource type that can be associated with interactive presentation.
message Presentable {
    required string id = 1; // In case of a template presentation.
    required Type type = 2; // In case of a folder presentation (via playlist).
}
enum Type {
    DOCUMENT = 1;
    PLAYLIST = 2;
}
message PresenterSession {
    required string id = 1;
    required ParticipantConnection connection = 2;
    required int64 expiry_timestamp = 3;
}
```

-continued

```
message ParticipantConnection {
    required string pin = 1; // PIN (e.g. 6 digits).
    required string url = 2; // Connection URL.
}
```

Once a presenter has session data (e.g. received at 314 or 350 of process 300 above), the CA 142A can connect to that presentation session. This is described with reference to process 400 of FIG. 4.

At 402, the CA 142A generates a connect presenter message and communicates it to the SA 104. The connect presenter message includes data required to connect to a presentation, e.g.: a session identifier. Further, the connect presenter request is associated with (or otherwise includes) the presenter id.

At 404, the SA 104 receives the connect presenter message.

At 406 the SA 104 determines if the session identified in the connect presenter message exists. If not, processing proceeds to 408, otherwise to 412.

At 408, the SA 104 generates a session does not exist message (e.g. a flux error) and communicates this to the CA 142A. The session does not exist message is received by the CA 142A at 410, in response to which the CA 142A may cause an appropriate error message to be displayed.

In the present implementation, presentation sessions are created with a time limit. The SA 104 can determine this time limit in various ways. By way of example, the SA 104 may be configured to: apply a same, constant time limit if n hours to all presentation sessions (e.g. n=0.5 hours, 1 hour, 2 hours, 6 hours, or an alternative time limit); apply a time limit based on a user status (e.g. 1 hour for general users, greater than 1 hour for premium users); apply a time limit based on user input (e.g. where a user requests a session to run for x hours when initiating the presentation at 302).

Furthermore, if a presenter disconnects from a session (without actively terminating the session as described below), the SA 104 is configured to adjust the session's time limit—e.g. to the earlier of the original expiry time or m hours from the presenter's disconnection (e.g. m=1 or an alternative value). In the event the presenter reconnects, the SA 104 readjusts the session time limit—for example by returning it to the original session time limit (n hours from the commencement of the presentation session).

Accordingly, at 412 the SA 104 determines and sets a session expiry. In the present example: if the presenter is connecting to the session for the first time, the SA 104 sets the session expiry to the session time limit (i.e. n hours from the creation of the presentation session); if the presenter is re-connecting to the session, the SA 104 resets the session expiry to the session time limit (i.e. n hours from the presenter's creation of the presentation session).

Furthermore, where a presenter is reconnecting, the SA 104 updates the TTL of the IMDB presentation session data for the session in line with the reset session expiry.

At 414, the SA 104 creates a presenter sink, and at 416 the SA 104 initiates a streaming connection with the presenter's CA 104.

As described in further detail below, during a presentation, the SA 104 periodically retrieves interaction data from the IMDB 110 (discussed below) and writes that data (or data based thereon) to the presenters sink. The interaction data written to the sink is then streamed from the sink to the presenter's CA 142 over a streaming connection.

Byway of example, a presenter sink may be created using the Flux.create command, and the streaming connection may be an RSocket channel.

At 418, the CA 142B receives the request from the SA 104 to create the streaming channel and completes establishment thereof.

By establishing a streaming channel, from a client application perspective the presenters CA 142A is connected to the SE 102 with a constantly kept alive streaming connection that allows real-time (or near real-time) interactions to be pushed to the CA 142A. This allows the service to hold the client connection rather than constantly being polled from the presenter's CA 142A, which would require three way TCP handshakes+8 more because of HTTPs on every request. In contrast, the streaming connection limits the TCP handshake and SSL handshake to just once (so one choreography of 3 way+8) instead of multiple times.

Figure 5:
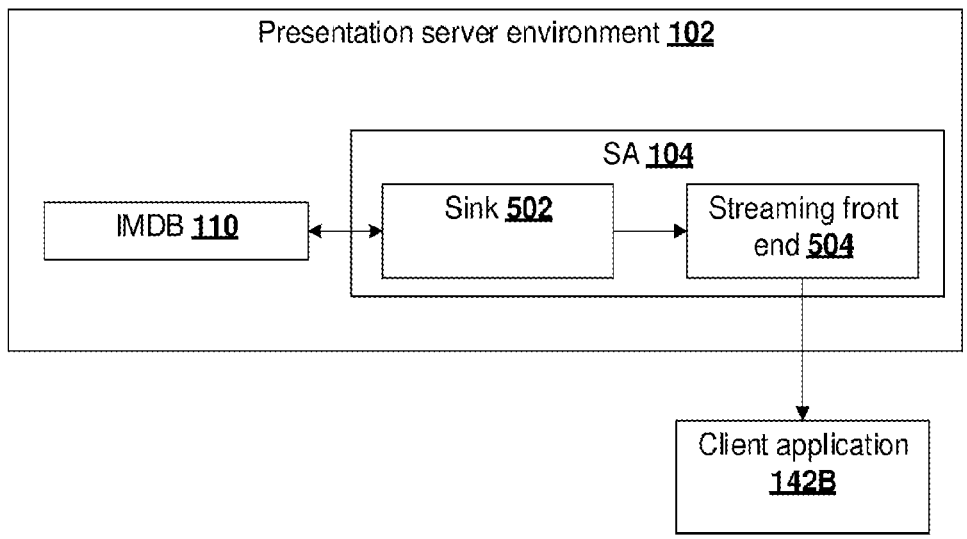
FIG. 5 depicts logical components involved in streaming interactions to a client application.

FIG. 5 provides a logical view of the streaming connection established with the presenter's CA 142. Specifically, the SA 102 retrieves data from the IMDB 110 and writes it to sink 502. Data from the sink 502 is then streamed to the client application 142B via the streaming connection (streaming front end 504).

To further illustrate the above, an example API call that can be used for a presenter to connect to a presentation session is as follows. Alternative API calls can be

```
// API call to open a stream to receive updates for the presenter.(Called,
e.g., at 402).
// If a presentation is not running, a flux error will be sent to the client.
    rpc connectPresenter (ConnectPresenterRequest) returns (stream
PresenterSyncMessage) {
        option (protogen.request_message) =
        "<path>.api.ConnectPresenterRequest";
    }
```

Example data types that can be used with the above API areas follows. Alternative data types can be used.

```
// Request to open presenter updates stream.
message ConnectPresenterRequest {
    required string session_id = 1;   // Session id needed for presentation.
}
//PresenterSyncMessage described further rbelow
```

Once the streaming channel has been established between the SE 102 and CA 142A the presentation session is in progress. As described below, while the presentation session is in progress the presenter and/or participants can perform various interactions. Each interaction causes an interaction record to be added to the interaction log maintained by the IMDB 110.

In order to communicate interactions to the presenter's CA 142A, the SA 104 periodically pols the IMDB 110 to retrieve interaction records. Retrieved interaction records are added to the presenter sink 502 created at 414 and, from the sink 502, streamed to the presenter's CA 142A over the streaming channel established at 416/418.

Figure 6:
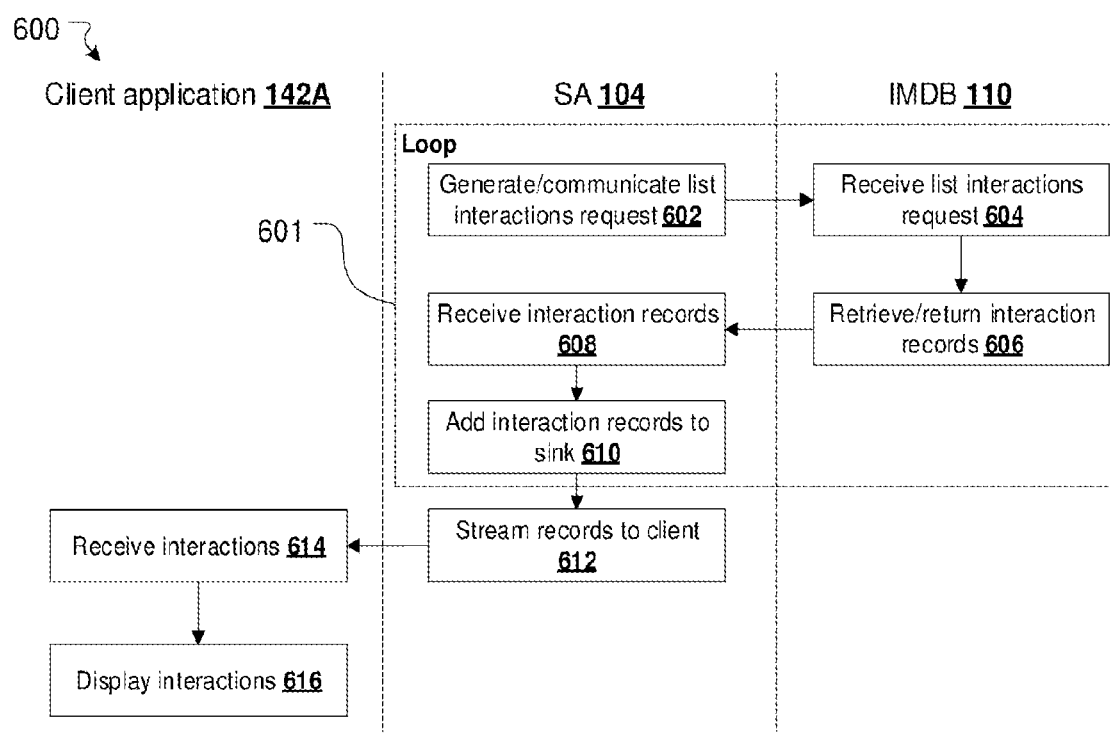
FIG. 6 depicts operations involved in a presenter reconnecting to an interactive presentation session.

Turning initially to FIG. 6, a presenter reconnection process 600 will be descried. The presenter reconnection process 600 is performed when a presenter reconnects to a presentation session after disconnecting, and serves to provide all relevant interaction data for the session to the presenter's CA 142A (some of which will have been lost as a result of the disconnection, and some of which may have been missed during the disconnected period).

In the present embodiment, retrieving data from the IMDB 110 is performed in a paginated manner by implementing an interaction retrieval processing loop 601. Each loop serves to retrieve a maximum number of interaction records from the IMDB 110 (the maximum number defined by the interaction API Pagination Size): with looping continuing until all required records are retrieved.

At 602, the SA 104 generates a list interaction records request and queries the IMDB 110 with that request.

With the example Redis data structures described above, the XRANGE command can be used to do this. Specifically, the paging size (which can be set as a session parameter) is passed to the Redis API parameter COUNT. The top N (N being an integer) records will then be fetched from Redis. E.g.:

XRANGE SIP_SESSION_KEY−+COUNT N

The entry id of the last entry of the result generated by the above is then retrieved and used to fetch the next page. E.g.:

XRANGE SIP_SESSION_KEY STARTING_ENTRY_ID+COUNT N

Subsequent list interactions requests in the session take the following form: P XRANGE SIP_SESSION_KEY LAST_ENTRY_ID+

At 604, the IMDB 110 receives the list interactions request.

At 606, the IMDB 110 processes the list interactions request in order to retrieve the requested interaction records and return them to the SA 104.

At 608, the SA 104 receives the interaction records from the IMDB 110. An example format for each interaction record is described above.

If all required interaction records have been retrieved from the IMDB 110, the interaction retrieval processing loop stops. Otherwise, processing returns to 602 to retrieve the next page of interaction records.

At 610 the SA 104 adds the received interaction records or data based thereon) to the sink 502 maintained by the SFE 106.

As discussed further below, in some implementations participants are able to delete interactions they have previously submitted. In this case, and in certain embodiments, once the SA 104 has received interaction records from the IMDB 110 it is configured to process the records to determine if there are any add-type interactions that have a corresponding delete-type interaction. If any corresponding add/delete interaction pairs are identified, these are not added to the sink 502 at 610.

To illustrate this, consider again the example interaction log provided above with key sip:{8B5D638D-2858-4A69-8430-5CA0323 5768E}. This log includes an add-comment type interaction, which is assigned entry_id 1553171306228-0. The log also includes a subsequently submitted delete_comment type interaction, which is assigned entry_id 1553171306227-1. The content of the delete_comment type interaction provides a target entry_id of 1553171306226-0 (i.e. the add_comment interaction). In this case, and presuming the add-comment interaction had not already been added to the sink 502, the SA 104 would identify the add_comment and delete_comment interactions as a corresponding add/delete interaction pair and would not add either of these interactions to the sink 502.

At 612, records added to the sink 502 are streamed to the CA 142B (a continuous process).

At 614, the CA 142A receives the streamed interaction records.

At 616, the CA 142A updates a presentation user interface to display information in respect of any interaction records received at 614. The manner in which a given interaction record will be displayed will depend on the type of interaction. By way of example, if an interaction record is in respect of a comment-type interaction, the text of the comment interaction may be displayed in a comments user interface pane such as pane 1420 described below.

Figure 7:
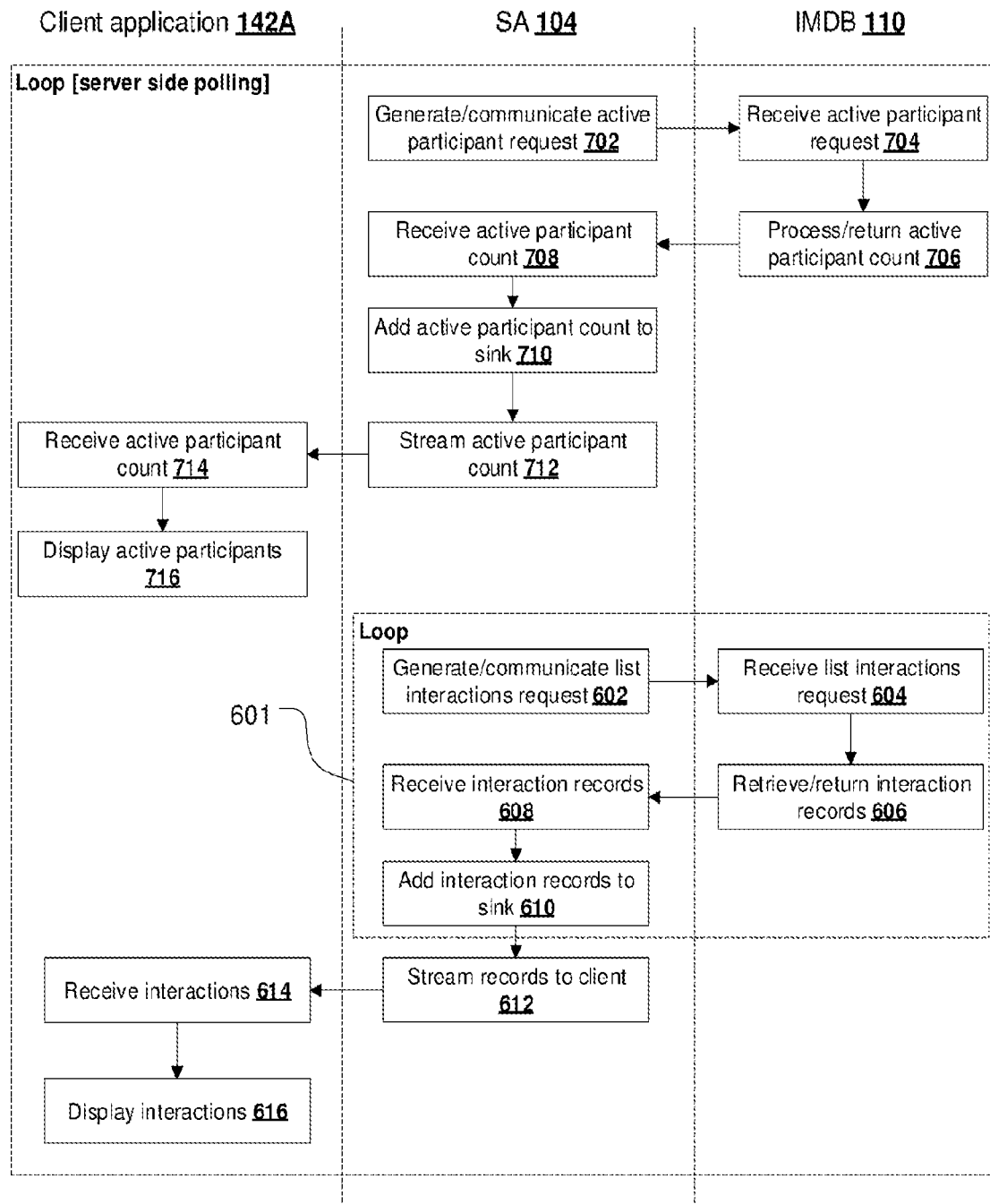
FIG. 7 depicts operations involved in an interaction polling process.
Figure 8:
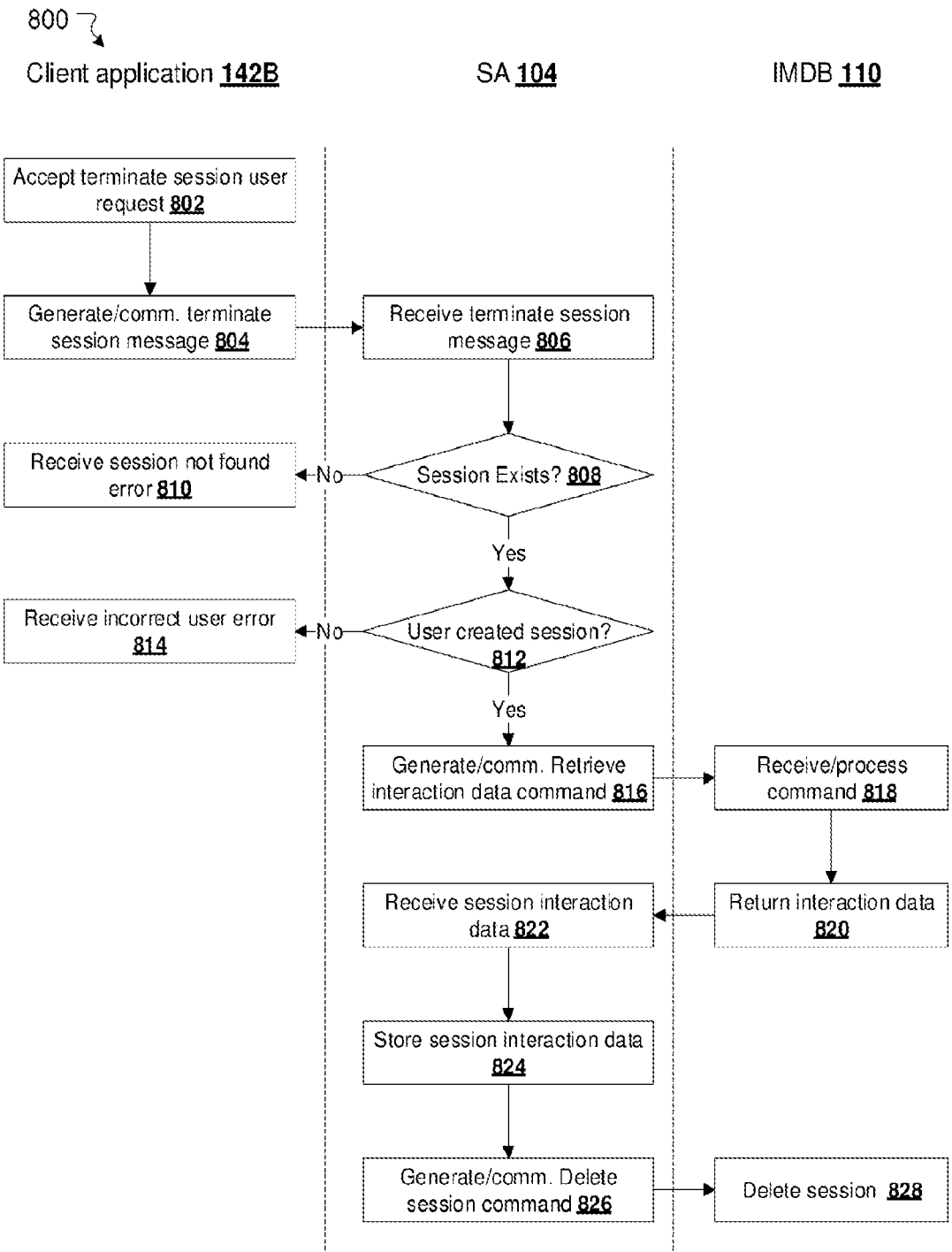
FIG. 8 depicts operations involved in a presenter terminating an interactive presentation session.

While a presenter CA 142A is connected to a presentation session, the SA 104 periodically performs a presenter polling process. Each time the presenter polling process is performed, the SA 104 polls the IMDB to (in this example) determine the number of connected participants and retrieve any new interactions that have been made. The presenter polling process 700 is described with reference to FIG. 7.

In the present embodiments, each loop of polling process 700 results in one or more messages being communicated to the CA 142A via the streaming connection. The first message is a message providing the CA 142A with participant count (i.e. the number of participants connected to the session). Second and subsequent messages contain any interactions that have been received since the last polling loop was performed.

The SA 104 may be configured to poll the IMDB 110 at any desired frequency. As an example, the poling frequency may be one second, which provides a reasonable response time without overloading the IMDB 110.

In certain implementations, the SA 104 is configured to establish a polling thread for each active presentation session.

In alternative implementations, the SA 104 is configured to establish polling threads that are each associated with multiple sessions (or a single polling thread that handles IMDB 110 polling for all presentation sessions). In this case the data returned by the polling thread is processed by the SA 104 in order to separate out each presentation session's data and provide the relevant data to the relevant sinks 502. Such an implementation may be appropriate where the SE 102 needs to handle multiple simultaneous sessions and an individual polling thread per session is not appropriate from a computational resource perspective.

By way of example, the SA 104 may be configured to create a polling thread by creating an UpdatePoller which uses an ExecutorService to periodically (e.g. every poll the IMDB 110.

In each loop of polling process 700, an active participant request is made to the IMDB 110, made in order to determine the number of participants that are connected to the presentation session.

At 702, therefore, the SA 104 generates an active participant request and queries the IMDB 110 with that request. An example request for calculating active participants is described below.

At 704, the IMDB 110 receives the active participants request.

At 706, the IMDB 110 processes the active participants request and returns an active participant count to the SA 104.

With the example participant data described above, the number of active participants can be determined using the ZCOUNT command can be used. E.g.:

ZCOUNT SESSION_ID<CURRENT_TIMESTAMP−POLLING PERIOD>+INF

This command counts the participants that have been active in a given session within the last polling period.

To illustrate this, consider 3 participants (p1, p2, and p3) who poll every 5 seconds and the polling frequency is 5 seconds.

At 2020-03-17 12:51:54, all three participants call the polling API, in which case the participant data is:

{p1:1584449339.0, p2: 1584449339.0, p3:1584449339.0}

The following call is then made:

ZCOUNT sip:{session_id}:participants 1584449335+inf

The result is 3 (indicating 3 active participants). 1584449335 is calculated by subtracting 5 seconds from the current timestamp.

Five seconds later, participant 3 drops out therefore does not call the polling API. The participant data structure is then:

{p3:1584449339.0, p1: 1584449344.0, p2:1584449344.0}

The ZCOUNT call will then return 2.

At 708, the SA 104 receives the active participant count (e.g. an integer) from the IMDB 110.

At 710 the SA 104 adds the active participant count to the sink 502 maintained by the SFE 106.

In due course, the active participant count is streamed from the sink 502 to the CA 142A over the streaming connection (illustrated as occurring at 712).

At 714, the CA 142A receives the active participant count.

At 716, the CA 142A updates a display to inform the user of the number of active participants in the presentation session (e.g. by updating a 'participant counter' or the like that is displayed on a presentation user interface at the client system 142—e.g. participant count display 1414 as described below).

Each polling loop also involves requesting new interaction records from the IMDB 110. This is similar to process 600 as described above, including interaction retrieval processing loop 601, with the exception that rather than requesting all interactions since commencement of the presentation session, only interactions since the last poling loop are requested.

To further illustrate the above, example data types that can be used to communicate data with the presenter CA 142A while a session is in progress are as follows. Alternative data types can be used. The example data types use comment-type interactions for illustration purposes, however as discussed further below additional and/or alternative interaction types are possible.

```
message PresenterSyncMessage {
  oneof kind {
    CreateCommentSyncMessage comment = 1;
    DeleteCommentSyncMessage delete_comment = 2;
    ParticipantStatusSyncMessage status = 3;
    //additional interactions to be defined as required
  }
}
message CreateCommentSyncMessage {
  required Comment comment = 1;
}
message DeleteCommentSyncMessage {
  required string comment_id = 1;
}
message ParticipantStatusSyncMessage {
  required int32 total_connected = 1; // Number of unique participants connected.
}
// Comment-type interaction
message Comment {
  required string id = 1; // Unique comment ID for a given interactive session.
  required string content = 2;  // Plain text content of a comment.
  required string author_id = 3;  // Unique ID of a comment author.
```

-continued

```
  optional string author_name = 4;  // Optional name of the author.
  required int64 created = 5;  // Time comment created (e.g. Unix timestamp in ms)
}
```

In the present embodiments, the creator of a presentation session can terminate that session at any point while the session is running. In order to do so, the session creator can activate an end presentation control or the like displayed on a presentation user interface at the client system 140A.

In the present example, at 802 the CA 142A detects and accepts a terminate session user request (e.g. a user activating an end session control).

At 804, the CA 142A communicates generates a terminate session message and communicates this to the SA 104. The terminate session message may include (or be associated with) the session identifier of the session being terminated and the identifier of the presenter terminating the session.

At 806, the SA 104 receives the terminate session message.

At 808, the SA 104 determines if the session referenced by the terminate session message exists. As described above, this involves checking whether the IMDB 110 has a session metadata record for the session. If not, a session not found error is generated and returned to the CA 142A (the error being received at the CA 142A at 810).

If the session referenced by the terminate session message does exist, processing proceeds to 812. At 812, the SA 104 determines if user associated with the terminate session message is the user that created the session being terminated. If not, an incorrect user/forbidden error is returned to the CA 142A (received at 814).

If the session does exist (at 808) and the terminate session message is associated with the user who created the session (at 812), processing continues to 816.

At 816, the SA 104 generates a retrieve interaction data command (or set of commands) and communicates this to the IMDB 110. The retrieve interaction data command is generated to retrieve interaction data relating to the session from the IMDB 110—e.g. session metadata and interaction records.

With the example Redis data structures described above, session metadata can be retrieved with a command such as:

HGETALL sip:<session_id>:meta

Interaction records can be retrieved from the transaction log with a command such as the following (the '+' indicating open ended):

XRANGE sip:<session_id>:events last_event_id+

At 818, the IMDB 110 receives and processes the retrieve interaction data command, and at 820 responds with the interaction data requested.

At 822, the SA 104 receives the interaction data from the IMDB 110.

At 824, the SA 104 causes the interaction data to be persistently stored (e.g. in persistent data store 118).

Interaction data may be persistently stored in various ways. By way of example, the interaction data can be written to a persistent database such as MySQL, Oracle, or an alternative persistent database. The interaction data is associated with a presentation (or other) identifier that allows that data to be retrieved and synchronised with non-interaction presentation data to create a faithful replay of the presentation.

In certain implementations, when the interaction date is persistently stored offset timestamps are calculated and stored for interactions. In this context an offset timestamp is a timestamp that is offset from the start of the presentation session that the interaction was made—e.g. an offset timestamp of 2 minutes indicates 2 minutes after a presentation started. Offset timestamps can be calculating by subtracting the session start timestamp (maintained in the session metadata) from the interaction event timestamp (maintained in the interaction transaction log). Interaction offset timestamps can then be used when a presentation is replayed.

At 826, once the interaction data has been retrieved from the IMDB 110, the SA 104 generates and communicates commands to the IMDB 110 to delete the session.

With the example Redis data structures described above, deleting a session involves deleting all data associated with that session—e.g. session metadata, participant data, interaction log, PIN/presentation lookup data, presentable/presentation lookup data. Example commands to do so are as follows:

DEL sip:<session_id>:meta
DEL sip:<session_id>:events

At 818, the IMDB 110 receives the delete session command(s) and, in response, deletes the data maintained for the session indicated by the session identifier.

Once the presenter has terminated the presentation session, any future participant polls will indicate to the participant(s) that the session is no longer active, causing the participant CAs 142B to disconnect from polling.

While not shown, in certain embodiments the CA 142A may be configured to display a prompt to a session creator prior to terminating a session. For example, the CA 142 may be configured to determine if there are any active participants to the session being terminated and, if so, display a message indicating the number of connected participants and seeking confirmation (via activation of an appropriate control) that the session should be ended. The number of active participants may be taken from the last active participant count received (at 714) or the CA 142A (or SA 104) may be configured to request a current active participant count (at the time the terminate session event is detected).

To further illustrate the above, an example API call that can be used for a presenter to terminate a presentation session is as follows. Alternative API calls can be used.

```
// E.g. API call to terminate a running interactive session. (Called, e.g., at
804).
// Calling getPresenterSession after this will result in a NotFound.
// If the session does not exist, method will throw a NotFound.
// If called by a user who did not create the session, will throw Forbidden.
  rpc deleteSession (DeleteSessionRequest) returns
  (DeleteSessionResponse) {
     option (google.api.http) = {
       delete: "/session/{session_id}"
     };
  }
}
```

Examples data types that can be used with the above API are as follows. Alternative data types can be used.

```
            message DeleteSessionRequest {
              // ID of the session.
              required string session_id = 1;
            }
            // Throw a 404 if not found.
            message DeleteSessionResponse {
            }
```

Termination of a session due to the occurrence of a termination event is to be distinguished from, for example, a presenter disconnecting from a session (which can occur at any point—e.g. due to network or other technology failures). In the present embodiments, a presenter disconnection does not cause the presenter's presentation session to be terminated. Rather, as discussed above, on detecting that a presenter who is the creator of a given session has disconnected the SA 104 causes the session expiry time to be updated.

Example processing for presentation participants (e.g. non-presenters) will now be described.

Figure 9:
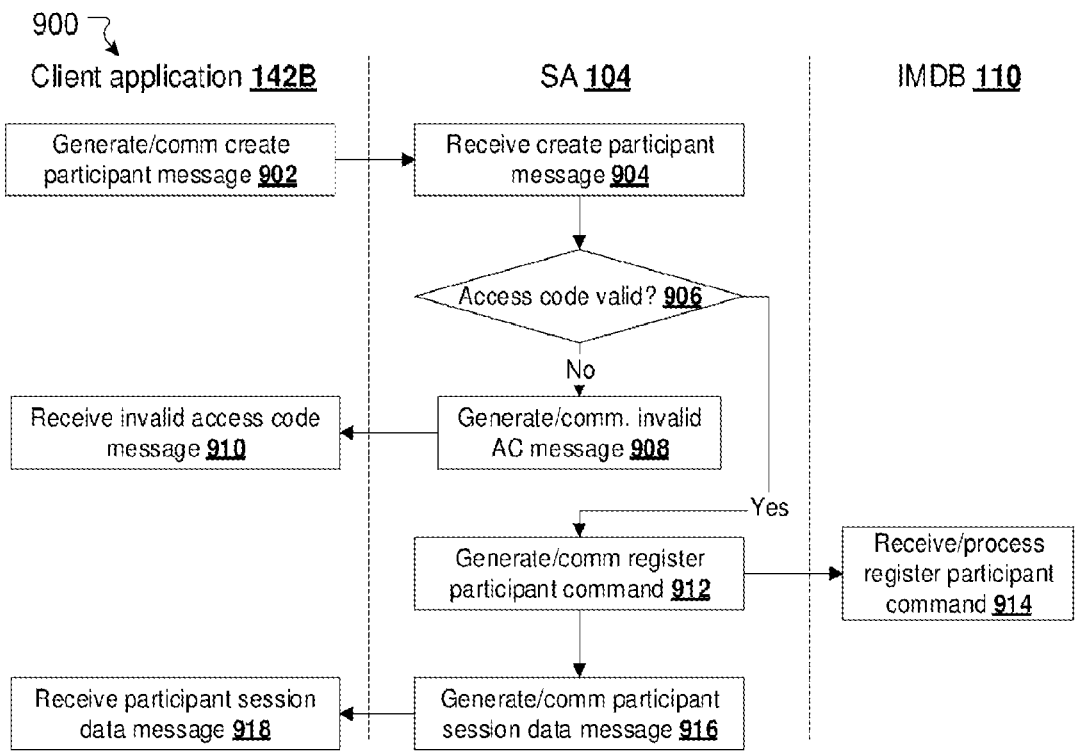
FIG. 9 depicts operations involved in a participant connecting to an interactive presentation session.

Turning to FIG. 9, processing for a participant (using a client system 140B on which a CA 142B is running) to connect to a presentation session will be described.

At 902, the CA 142B generates a create participant message. This may be triggered by a user of the client system 140B activating a connect to presentation control displayed at the client system 140B—e.g. a hyperlink in an email or other message, a 'join presentation' control, or an alternative control.

The create participant message is communicated to an endpoint defined by the resource locator for the presentation session in question and includes data required to connect to a presentation, e.g. a session PIN/access code. The CA 142B may receive the session details (e.g. resource locator and access code) in various ways, for example via an email/instant/chat (or other electronic) message, a document, a calendar invite, from a website, or in any other appropriate manner.

The create participant message may also include, or be associated with, a participant identifier (examples of which are described above).

At 904, the SA 104 receives the create participant message.

At 906 the SA 104 determines if the PIN included in the create participant message is valid.

If the PIN is not valid, at 908 the SA 104 generates an invalid PIN/access code message (e.g. a 401/Unauthorized message) and communicates this to the CA 142B. The invalid access code message is received at the CA 142B at 910—where the CA 142B may cause an appropriate error message to be displayed.

If, at 906, the access code is valid, processing continues to 912.

At 912, the SA 104 generates a register participant command and communicates this to the IMDB 110.

With the example Redis data structures described above, registering a participant involves associating the participant identifier with the session identifier—for example with the following command:

SET    sip:<participant_id>:participantsession    <session_id>

In addition, data is written to the participant data structure to record the participant as an active participant—for example with the following command ZADD    sip:<session_id>:participants <last_seen_time><participant_id>

At 914, the IMDB 110 receives and processes the register participant command.

At 916, the SA 104 generates a participant session data message and communicates this to the CA 142B. The participant session data message includes data required for the participant to interact in the presentation session, which, in this example, is the session identifier which is used in downstream API calls made by the participant.

At 918, the CA 142B receives the participant session data message. The participant is then connected to the session and can interact as discussed further below.

To further illustrate the above, an example API call that can be used for a participant to connect to a presentation session is as follows. Alternative API calls can be used.

```
// E.g. request to connect into a presentation session as a participant.
// (Called, e.g., at 902)
// Returns 401/Unauthorized if pin is invalid.
    rpc createParticipant (CreateParticipantRequest) returns
(CreateParticipantResponse) {
        option (google.api.http) = {
            post: "/session/participant"
            body: "body"
        };
    }
}
```

Examples data types that can be used with the above API are as follows. Alternative data types can be used.

```
message CreateParticipantRequest {
    required string pin = 1;
}
message CreateParticipantResponse {
    required string session_id = 1;
}
```

Figure 10:
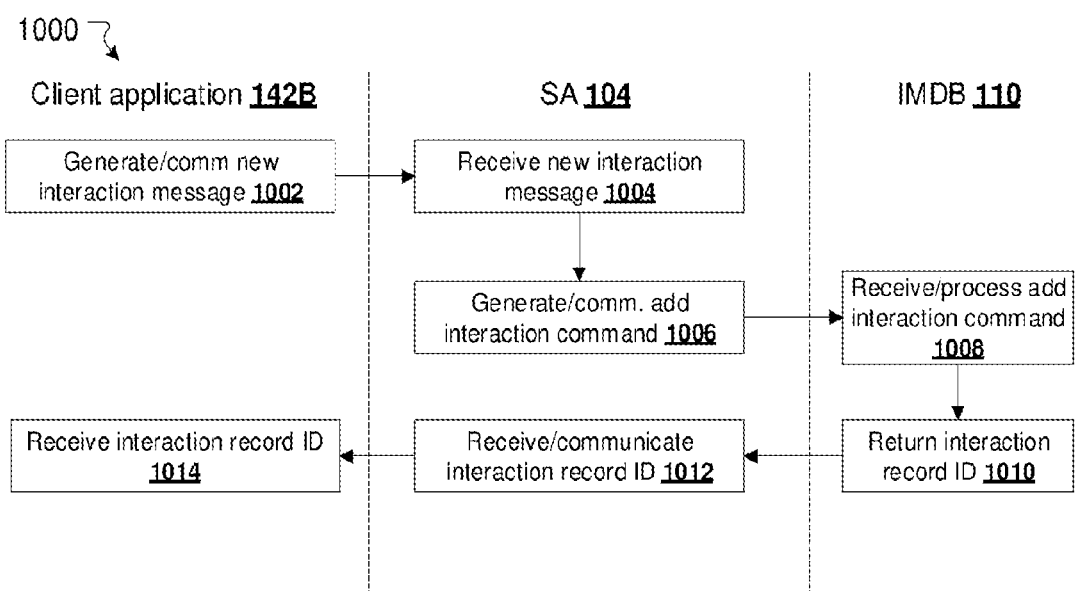
FIG. 10 depicts operations involved in a participant interacting in an interactive presentation session.

Turning to FIG. 10, processing for a participant to interact in a presentation to which they are connected (via CA 142B) will be described.

At 1002, the CA 142B generates a new interaction message and communicates this to the SA 104. Generation of a new interaction message will typically be in response to a user of system 140B activating a new interaction control and, if required by the type of interaction, providing participant interaction data.

Generally speaking, a given interaction involves a participant interacting with their client system 140B. The particular interaction will depend on the type of interaction in question.

For example, a reaction-type interaction, which causes a user reaction to be displayed on a presenter user interface, may involve the participant selecting a particular reaction control displayed on their device 140B (e.g. a thumbs-up (approve) control, a thumbs-down (disapprove) control, an alternative reaction control). In this case, the new interaction message will indicate the type of interaction (e.g. a reaction) and include interaction data (e.g. the specific reaction of the participant).

As another example, a comment-type interaction may involve a participant entering comment data (e.g. text or the like) and activating a 'submit comment' control. In this case, the new interaction message will indicate the type of interaction (e.g. a comment) and include interaction data (e.g. the comment data entered by the participant).

At 1004, the SA 104 receives the new interaction message.

At 1006, the SA 104 generates an add interaction command and communicates this to the IMDB 110.

With the example Redis data structures described above, interactions are added to the interaction log, e.g.:

XADD sip:<session_id>:events <user event>

At 1008, the IMDB 110 receives and processes the add interaction command. This results in an interaction record in respect of the interaction being added to the interaction log. In this example, adding the interaction record to the interaction log results in a unique interaction record identifier to be generated for that record (entry_id in the example interaction log above).

At 1010, the IMDB 110 returns the interaction record identifier to the SA 104.

At 1012, the SA 104 receives the interaction record identifier from the IMDB 110 and communicates it to the CA 142B.

At 1014, the CA 142B receives the interaction record identifier from the SA 104. This message serves as a confirmation that the interaction has been correctly received and, accordingly, will be received by the presenter. In addition, interaction record identifier may be stored by the CA 142B for downstream use (e.g. if the participant decides to delete the interaction).

To further illustrate the above, an example API call that can be used for a participant to interact during a presentation session is as follows. Alternative API calls can be used. The particular example provided is in respect of a comment-type interaction, however as discussed below different types of interactions are possible.

```
// Create a comment-type interaction (called, for example, at 1002).
    rpc createComment (CreateCommentRequest) returns
(CreateCommentResponse) {
        option (google.api.http) = {
            post: "/session/{session_id}/comment"
        };
    }
}
```

Examples data types that can be used with the above API are as follows. Alternative data types can be used.

```
message CreateCommentRequest {
    required string session_id = 1;
    required string content = 2;   // Plain text content of a comment.
    optional string author_name = 3;   // Name of the author.
}
message CreateCommentResponse {
    required Comment comment = 1; // Newly created comment.
}
message Comment {//as described above}
```

The example above provides for an optional author_name field to be associated with the interaction. This allows participants to interact (e.g. submit comments) to the presenter under a particular name (or to leave NULL for anonymous comments). In alternative embodiments the author name may be required and/or determined from the interaction submitter's user account.

Figure 11:
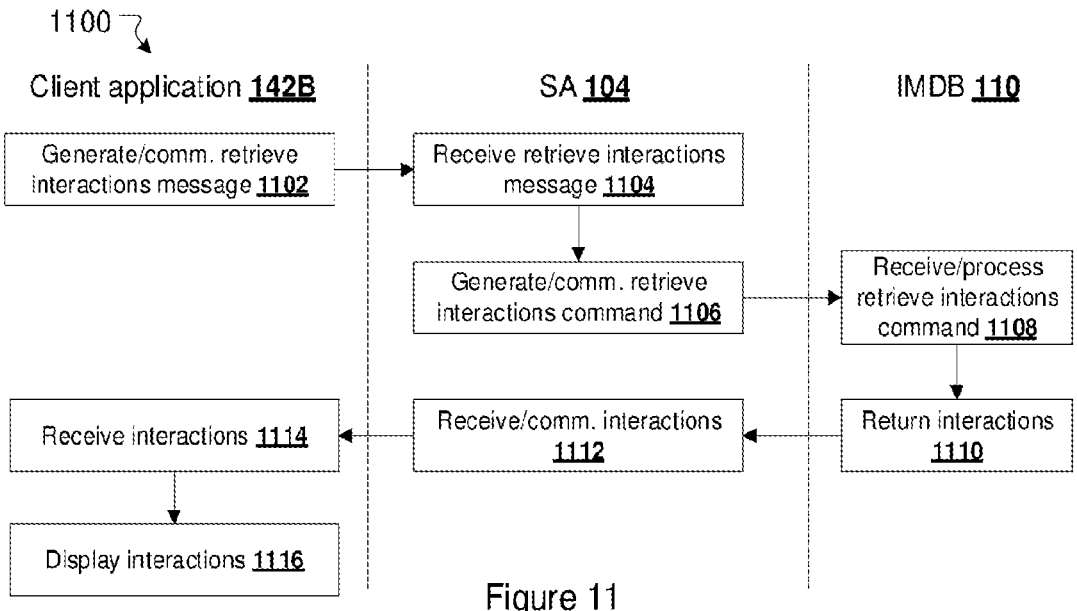
FIG. 11 depicts operations involved in a participant retrieving interactions they have made during an interactive presentation session.

Turning to FIG. 11, processing for a participant to retrieve any interactions they have submitted during a given presentation will be described.

At 1102, the CA 142B generates a retrieve interactions message and communicates this to the SA 104. Generation of a retrieve interactions message may be automatically performed by the CA 142B, for example, when a participant reconnects to a presentation after disconnecting, or opens the same presentation in another client application (e.g. another web browser window or tab).

A retrieve interactions message includes a presentation session identifier and is associated with a participant identifier.

At 1104, the SA 104 receives the retrieve interactions message.

At 1106, the SA 104 generates a retrieve interactions command and communicates this to the IMDB 110.

With the example Redis data structures described above, retrieving interactions from the interactions log can be performed, for example, as follows ('−' indicating the beginning and '+' indicating the end):

XRANGE sip:<session_id>:events −+

In this example, the SA 104 retrieves all interactions for the session from the IMDB 110. In this case the SA 104 then filters the returned interactions using the participant identifier so only those relevant to the requesting participant are returned. In alternative embodiments, the IMDB 110 query can be modified to only retrieve interactions for the given session that were contributed by the participant in question.

At 1108, the IMDB 110 receives and processes the retrieve interactions command. This results in the IMDB 110 retrieving and returning (at 1110) a set of interactions to the SA 104.

At 1112, the SA 104 receives the interactions from the IMDB 110 and communicates them to the CA 142B (first filtering by the relevant participant ID if required).

At 1114, the CA 142B receives the interactions from the SA 104. The CA 142B may handle the received interactions in various ways, for example by displaying them in a presentation user interface at 1116.

To further illustrate the above, an example API call that can be used for a participant to retrieve their interactions is as follows. Alternative API calls can be used. The particular example provided is in respect of a comment-type interaction, however as discussed below different types of interactions are possible.

```
// Finds the participant's comments. (Called, e.g., at 1102)
rpc findComments (FindCommentsRequest) returns
(FindCommentsResponse) {
    option (google.api.http) = {
        get: "/session/{session_id}/comments?participant=me"
    };
}
```

Examples data types that can be used with the above API are as follows. Alternative data types can be used.

```
message FindCommentsRequest {
    required string session_id = 1;
    required int32 limit = 2 [default = 100];
    optional string continuation = 3;
}
message FindCommentsResponse {
    repeated Comment comments = 1;
    optional string continuation = 2;
}
message Comment {//as described above}
```

In certain implementations, the system may provide participants with the ability to delete interactions they have made. This option may not always be available. For example, if an interaction has already been communicated to the presenter deleting the interaction may not be possible. Alternatively, the system may not provide participants with an option to delete any interaction after it has been submitted.

Figure 12:
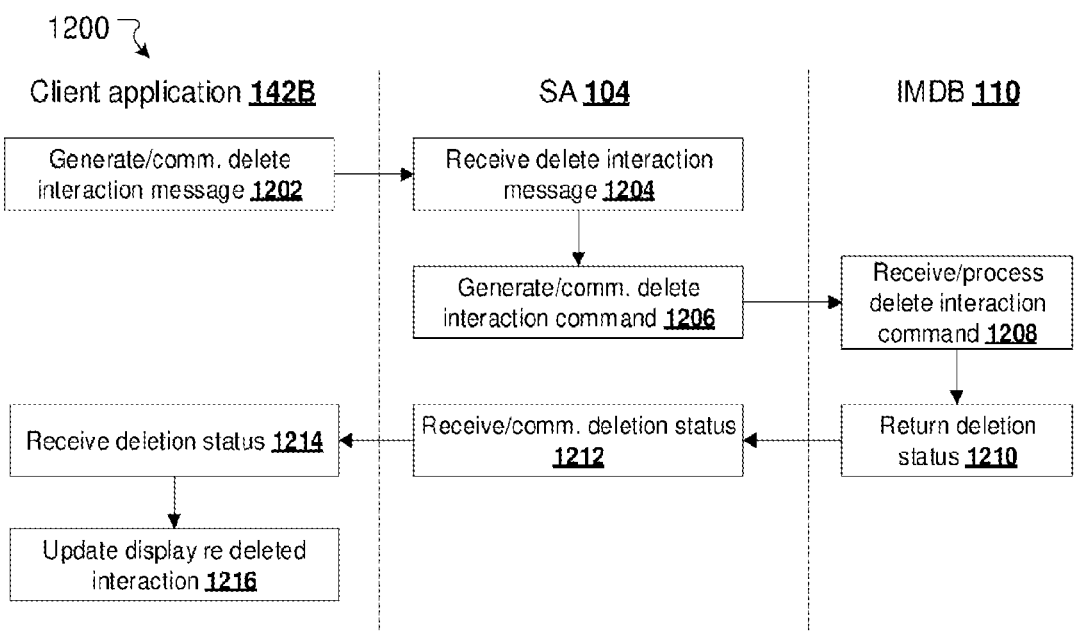
FIG. 12 depicts operations involved in a participant deleting an interaction they have made during an interactive presentation session.

Turning to FIG. 12, processing for a participant to delete an interaction they have submitted during a given presentation will be described.

At 1202, the CA 142B generates a delete interaction message and communicates this to the SA 104. Generation of a delete interaction message will typically be generated in response to user interaction—for example a user selecting a particular interaction (displayed on their presentation user interface) and activating a 'delete interaction' control.

A delete interaction message includes a presentation session identifier and interaction record identifier.

At 1204, the SA 104 receives the delete interaction message.

At 1206, the SA 104 generates a delete interaction command and communicates this to the IMDB 110.

With the example Redis data structures described above, deleting an interaction is achieved by providing 'delete' as a particular type of interaction. For example, comments may be added by 'add comment' type interaction and deleted by a corresponding 'delete comment' type interaction. In this case, deleting an existing interaction involves submitting a new interaction (a delete type interaction)—for example with the following command:

ADD sip:<session_id>:events <user event>

In this case, the event type will indicate a delete-type event, and will carry an identifier of an existing interaction (event) as the deletion target.

At 1208, the IMDB 110 receives and processes the delete interaction command. This results in the IMDB 110 adding a deletion interaction to the interaction log.

At 1210, the IMDB 110 returns a result of the operation. This is received by the SA 104 and (presuming the deletion was successful) communicated to the CA 142B at 1212.

At 1214, the CA 142B receives confirmation of the interaction deletion. The CA 142B may then, for example, update the user interface to delete the interaction in question (or otherwise display it as a deleted interaction).

From the presenter side, two scenarios exist where a particular interaction is submitted then that particular interaction is deleted.

In one scenario, an add-type interaction event (e.g. an add_comment interaction) is streamed to the presenter's CA 142A before the corresponding delete-type interaction is received and processed by the SA 102. In this case, the CA 142A will initially display the add-type interaction when it is received over the streaming connection and subsequently remove that interaction from the display when the corresponding delete-type interaction is received.

In the second scenario, the delete-type interaction is received and processed before the corresponding add-type interaction has been streamed to the presenter's CA 142A. In this case, the SA 102 may identify the corresponding pair of add/delete interactions and prevent either of them from being streamed to the presenter's CA 142A (as discussed above with reference to operations 608 and 610).

To further illustrate the above, an example API call that can be used for a participant to delete an interaction is as follows. Alternative API calls can be used. The particular example provided is in respect of a delete comment-type interaction, however as discussed below different types of interactions are possible.

```
// Deletes a comment. (Called, e.g., at 1202).
rpc deleteComment (DeleteCommentRequest) returns
(DeleteCommentResponse)
{
    option (google.api.http) = {delete:
        "/session/{session_id}/comment/{comment_id}"};
}
```

Examples data types that can be used with the above API are as follows. Alternative data types can be used.

```
message DeleteCommentRequest {
   required string session_id = 1;
   required string comment_id = 2;
}
message DeleteCommentResponse {
}
```

In addition to the above, while involved in a presentation session the CA 142B also periodically polls the SE 102 (independently of any participant interactions). This serves the dual purpose of determining for the CA 142B that the presentation session is still active/alive, and confirming to the SA 104 that the CA 142B is still connected. Participant polling is described with reference to FIG. 13.

At 1302, the CA 142B generates a participant status message and communicates this to the SA 104. CA 142B is configured to do this periodically while the CA 142B is connected to the session, for example every 5 seconds (or an alternative frequency).

The participant status message includes (or is associated with) a session identifier and a participant identifier.

At 1304, the SA 104 receives the participant status message.

At 1306, the SA 104 generates a command attempting to update the participant status as recorded by the IMDB 110 and communicates this to the IMDB 110. In the present embodiments, this involves attempting to record the time the participant status request was received against the participant.

With the example Redis data structures described above, updating the participant data can be performed, for example, as follows:
ZADD
SESSION_D<TIMESTAMP><PARTICIPANT_ID>

At 1308, the IMDB 110 receives and processes the update participant status command, and at 1310 returns the result of the command.

If session meta data for the session id in the command has been deleted (because the session has been terminated), the IMDB 110 will return a message or value indicating that the operation has failed. Otherwise, the IMDB will update the participant data for the participant in question and return a message/value indicating that the operation was successful.

At 1312, the SA 104 receives the result of the update participant status command.

At 1314, the SA 104 determines if the update participant status command was successful or not. If not, at 1316 the SA 104 generates a session terminated message and communicates this to the CA 142B.

At 1318, the CA 142B receives the session terminated message.

At 1320, the CA 142B closes the presentation session. This may involve generating and displaying a 'session terminated' type message.

In some implementations, if the SA 104 determines the update participant status command was successful at 1314 no further action is required (the CA 142B configured to optimistically interpret the absence of a response as indicating that the session is alive). In alternative implementations, the SA 104 generates a session alive message at 1322 and communicates this to the CA 1428, which receives it at 1324.

To further illustrate the above, an example API call that can be used for a participant to update their stats is as follows. Alternative API calls can be used.

```
// Informs server that participant is logged into live session. (Called, e.g., at 1302)
// This will not throw a 404 even if the session is not active.
// If session is not active returns the is_active flag set to false.
rpc updateParticipantStatus (UpdateParticipantStatusRequest) returns (UpdateParticipantStatusResponse) {
   option (google.api.http) = {
      post: "/session/participant/{session_id}"
      body: "body"
   };
}
```

Examples data types that can be used with the above API are as follows. Alternative data types can be used.

```
message UpdateParticipantStatusRequest {
   required string session_id = 1 [(protogen.http_match) = "[a-zA-Z0-9_-]{11}"];
}
message UpdateParticipantStatusResponse {
   required bool is_active = 1;
}
```

Figure 13:
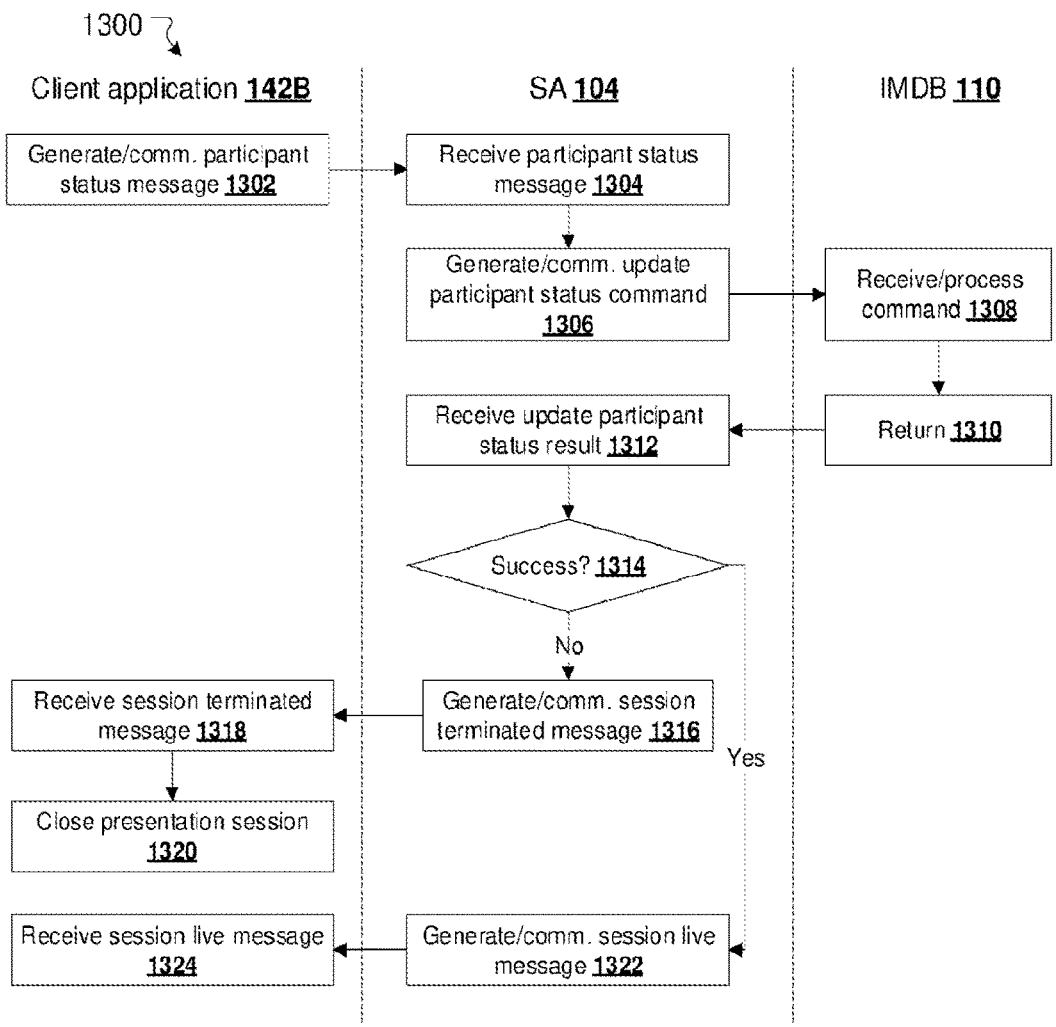
FIG. 13 depicts operations involved in a participant polling an interactive presentation session.

In the embodiments described above, presentation participants (i.e. non-presenters) are described as being connected by a non-streaming connection—e.g. via traditional RPC APIs built on HTTP request/response, involving individual/separate HTTPs connection being made each time a CA 142B communicates an interaction to the SA 104 or performs the client polling described with reference to FIG. 13.

Such a connection may be appropriate where the presentation interactions facilitated (or permitted) do not require significant real (or near-real) time update of participant client applications. E.g., if the only interactions permitted result in presenter updates (i.e. to presenter CA 142A only) a streaming connection will not typically be warranted (though could still be implemented if desired). Examples of such interactions are presenter-comments (e.g. posting comments that are only displayed to a presenter), presenter-reactions (e.g. posting reactions that are only displayed to a presenter), polling/survey interactions (where results are not shown to participants in real time), and other interactions that do not involve updating participant client applications 142B.

Alternatively, if the interactions permitted do involve updates to the participant CA's 142A a streaming connection is likely to be warranted. Examples of such interactions are broadcast comments (e.g. posting comments that are displayed to all connected participants), broadcast reactions (e.g. posting reactions that are displayed to all participants), polling/survey interactions where results are displayed to all participants in real time, and other interactions that involve updating participant client applications 142B.

In such cases, participant connection to a presentation session involves the SA 104 setting up a participant sink and streaming connection (e.g. as described above with respect to a presenter connection). A participant sink can be populated with data via a IMDB polling process similar to or the same as that described above (e.g. in FIG. 7), with the exception that a single thread could be configured to broadcast to all participant sinks that are established. Data added to a participant's sink is then sent to the participant's CA 142B over the streaming connection.

As noted, in certain embodiments presentation sessions have an expiry. In this case, if the SA 104 determines that the expiry of a session has been reached (before the session has been terminated by a terminate session event) the SA 104 automatically terminates the session.

Where IMDB session interaction data is created with a TTL, active deletion of that data on session expiry is not required (as the TTL will align with the session's expiry).

Where session interaction data is to be made available for presentation replays, however, prior to a session expiring and the IMDB session data expiring the SA 104 causes interaction data from the presentation to be persistently saved (e.g. in persistent data store 118). Example processing for persistently storing interaction data is described above with respect to operations 816, 818, 820, 822, and 824.

In certain embodiments, at a predefined time before a session expiry is reached (e.g. 1 minute, 5 minutes, 10 minutes, or an alternative time) the SA 104 determines if the session creator is connected (and there are any other connected participants). If not, the session is terminated at the expiry time. If the SA 104 determines that the session creator is still connected the SA 104 may communicate an 'extend session?' message to the session creator's CA 142A, which allows the creator to either decline (in which case the session is terminated at the current expiry) or accept (in which case the session expiry is extended without the session being terminated).

In the examples above, comment-type interactions have been used for illustrative purposes. In these examples, a participant (via their CA 142B) causes comment to be submitted that is then displayed at a presenter CA 142A.

Alternative interaction types can be implemented.

As one example, two types of comment-type interactions may be provided: presenter-comment and broadcast-comment type interactions. In this case, broadcast comments submitted by a participant are (ultimately) communicated to all connected client applications, participant and presenter.

In addition, or alternatively, reaction type interactions may be provided. A reaction type interaction is initiated by a participant (e.g. by activation of a reaction interaction control) and causes a particular graphic to be displayed by the presenter (and or other participant) client applications. Various reactions can be provided, such as: an approve reaction (causing an approve graphic such as a thumbs-up graphic to be displayed); a disapprove reaction (causing a disapprove graphic such as a thumbs-down/frowning face graphic to be displayed); and/or alternative reactions.

As with comment-type interactions, presenter-reaction and/or broadcast-interactions may be provided.

In addition, or alternatively, polling type interactions may be provided. Typically initiation of a polling type reaction will be restricted to a presenter, however this need not be the case. A polling type reaction is associated with a poll: e.g. one or more defined question to which participants provide a (typically defined) response. Initiation of a polling type reaction and defining the poling questions/responses can be performed by appropriate user interface controls. Once initiated, a polling type reaction causes a poll interface to be displayed by participant CAs 142B (e.g. an interface displaying the one or more poll questions and response options). Via the polling interface a participant selects responses to the polling question(s), which are communicated back to the SA 102 (e.g. in a poll-response type interaction message). The SA 102 then collates the responses and provides the poll results to at least the presenter CA 142A.

Furthermore, and for at least some types of interactions, an interaction may be an add-type interaction (indicating a new interaction is being provided) or a delete-type interaction (indicating that a previously provided interaction is being deleted). For example, in the description above both add-comment and delete-comment type interactions are provided. Other types of interactions may also have corresponding add- and delete-type interactions, for example an add-reaction and delete-reaction type interaction.

This section provides example user interfaces that a client application 142 causes to be displayed on a client system 140

Figure 14:
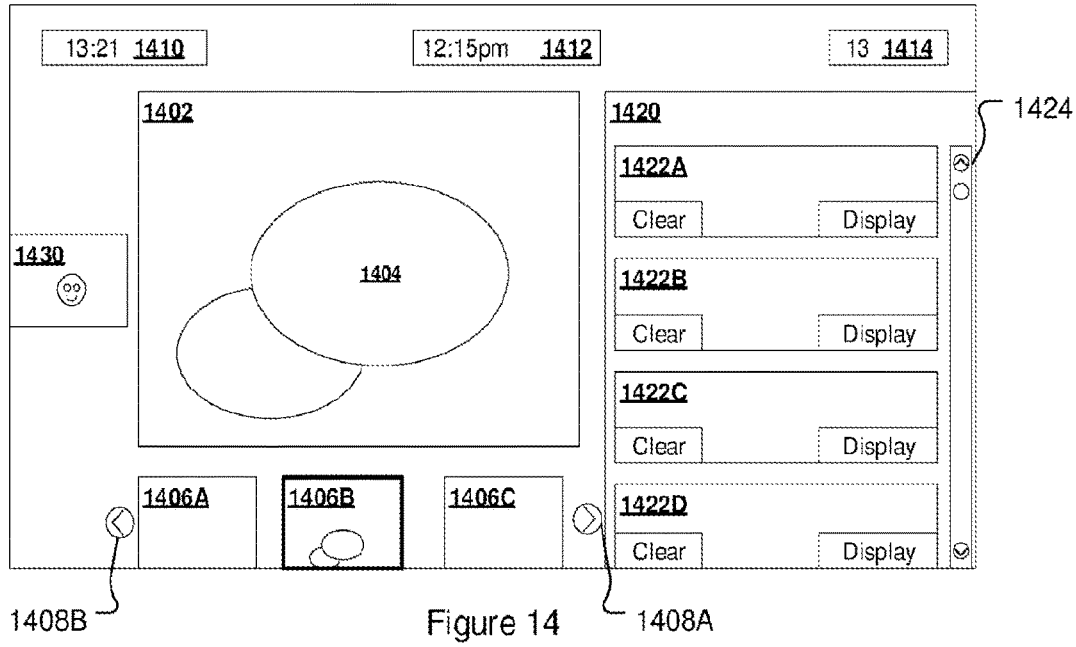
FIG. 14 depicts an example presenter user interface.

FIG. 14 depicts an example presenter user interface 1400 (i.e. a user interface displayed by a presenter's CA 142A).

UI 1400 of the present example includes a currently displayed content pane 1402. This pane displays supplemental content 1404 the presenter is currently using for the presentation (e.g. a slide, a document, or other supplemental content, identified for example by the 'presentable identifier' associated with the presentation as described above).

UI 1400 of the present example also includes supplemental content previews 1406. These are used to display additional supplemental content the presenter has prepared and can display in the presentation (e.g. in this example the next three slides). In addition, the preview of the supplemental content currently being presented is distinguished over other supplemental content (in this case preview 1406B is distinguished via a heaver-weight border).

UI 1400 of the present example also includes supplemental content preview navigation controls (in this case a forward control 1408A and a back control 1408B).

Via the preview navigation controls 1408 a presenter can navigate through the supplemental content for the presentation (e.g. by clicking or contacting the forward or back controls 1408) and select a given item of content (e.g. by clicking or contacting the content preview 1406). Doing so causes the supplemental content associated with the preview 1406 to be displayed in the presenter's UI (at 1402) and also all participant presentation user interfaces. In addition, any content transitions are logged for downstream replay.

UI 1400 of the present example also includes a presentation session running time 1410. This displays the amount of time the presentation session has been running (in this example 13 minutes 21 seconds).

UI 1400 of the present example also includes an actual time 1412. This displays the actual lime (typically in the presenters time zone).

UI 1400 of the present example also includes a participant indicator 1414. This indicates the number of participants currently connected to the presentation session (in this case 13 connected participants). As described above, the CA 142A periodically receives participant count data from the SA 102 over the streaming connection.

UI 1400 of the present example also includes a comment-type interaction pane 1420. This pane displays comment-type interactions that have been submitted by participants and received by the CA 142A over the streaming connection (as described above).

In this example, each comment-type interaction is displayed in a comment card 1422. Each comment card may include, for example, an identifier (or name) of the comment's author (if not anonymous) and at least part of the comment's content (e.g. text associated with the comment).

Each comment card 1422 of the present example also includes a display control and a clear control. The display control is operable to cause a pop-up to be displayed which includes full comment content (in the event it does not fit in the card 1422) and comment metadata (e.g. how long ago the comment was submitted, additional author information if available, etc.). The clear control causes the comment card 1422 to be removed from the comment-type interaction pane 1420.

The comment-type interaction pane 1420 further includes a navigation control 1424 (in this case a scroll bar) operable to navigate between the comment cards.

UI 1400 of the present example also includes a reaction-type interaction pane 1430. This pane displays any current reaction-type interaction that has been submitted by a participant and received by the CA 142A over the streaming connection (as described above).

In this example, the reaction-type interaction pane includes a graphic associated with the interaction (here, a smiley face). Additional information may also be displayed—for example the author of the interaction. Interactions may displayed in various ways, however in the present implementation they are transient: i.e. an interaction is displayed when it is generated by a participant but for a limited time only e.g. 5 seconds. 10 seconds, or an alternative amount of time).

In alternative embodiments, reaction-type interactions may be displayed in a pane such as the comment type interaction pane 1420 (and only removed on activation of a clear control or the like).

In still further alternative embodiments, comment and reaction-type interactions may be displayed in the same pane (e.g. a pane such as 1420).

Alternative user interfaces to that described above, including additional, fewer, or alternative user interface elements are possible.

As discussed, certain embodiments allow for presentation sessions to be faithfully replayed.

In order to replay a presentation session, both non-user interaction presentation data and user-interaction presentation data are retrieved from persistent storage (each data set being identified by an appropriate presentation session identifier).

The non-user interaction presentation data can then be replayed in any appropriate manner—typically in a video-player type interface.

As the non-user interaction presentation data is replayed, the current replay time is used to retrieve interactions from the user-interaction presentation data. When the replay reaches a time corresponding to a user interaction's timestamp, that interaction is displayed in the replay interface.

The flowcharts illustrated in the figures and described above define operations in particular orders to explain various features. In some cases the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by different systems or applications.

Unless otherwise stated, the terms "include" and "comprise" (and variations thereof such as "including", "includes", "comprising", "comprises", "comprised" and the like) are used inclusively and do not exclude further features, components, integers, steps, or elements.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

The invention claimed is:

1. A computer implemented method for providing participant interactions in a presentation session, the method comprising:
over the course of the presentation session, receiving a plurality of a-user interaction messages from one or more participant client applications, wherein each user interaction message is in respect of a user interaction performed at one of the one or more participant client applications during the presentation session;
for each user interaction message received, writing a corresponding interaction record to an in-memory database transaction log;
over the course of the presentation session, periodically performing a presenter polling process, each presenter polling process comprising:
retrieving new user interaction records from the in-memory database transaction log, wherein the new interaction records are interaction records that have been written to the in-memory database transaction log since performance of a previous presenter polling process; and
communicating the new user interaction records retrieved from the in-memory database transaction log to a presenter client application.

2. The computer implemented method according to claim 1, further comprising establishing a presenter data streaming connection with the presenter client application, and wherein in each presenter polling process the new user interaction records are communicated to the presenter client application over the presenter data streaming connection.

3. The computer implemented method according to claim 2, further comprising establishing a presenter sink, and wherein in each presenter polling process:
the new user interaction records retrieved from the in-memory database transaction log are added to the presenter sink; and
the presenter data streaming connection is configured to stream interaction records added to the sink to the presenter's client application.

4. The computer implemented method according to claim 1, wherein each presenter polling process further comprises:
determining an active participant count; and
communicating the active participant count to the presenter client application.

5. The computer implemented method according to claim 1, further comprising:
over the course of the presentation session, periodically receiving participant status messages, each participant status message being received from a participant client application and having an associated participant identifier; and
for each participant status message received, updating participant data maintained in an in-memory database participant data structure.

6. The computer implemented method according to claim 1, further comprising:
  determining the presentation session has ended; and
  in response to determining that the presentation session has ended:
    retrieving interaction data from the in-memory database, the interaction data comprising all interaction records stored in the in-memory database transaction log that are associated with the presentation session;
    storing the interaction data in persistent storage; and
    deleting all interaction records associated with the presentation session from the in-memory database transaction log.

7. The computer implemented method according to claim 1, wherein each user interaction message defines an interaction type.

8. The computer implemented method according to claim 7, wherein a given interaction message may define an interaction type selected from a group comprising: an add-comment type interaction; a remove-comment type interaction; an add-reaction type interaction; a remove-reaction type interaction; an add-poll response type interaction; a remove-poll response type interaction.

9. The computer implemented method according to claim 1, wherein user interaction messages from a participant client application are received over a non-streaming data connection.

10. The computer implemented method according to claim 1, wherein user interaction messages from a given participant client application are received over a participant streaming data connection established with the given participant client application.

11. A computer processing system comprising:
  one or more processors;
  a communication interface; and
  a non-transient computer-readable storage medium storing instructions which, when executed by the one or more processors, cause the one or more processors to perform a method for providing participant interactions in a presentation session, the method comprising:
    receiving, via the communications interface and over the course of the presentation session, a plurality of user interaction messages from one or more participant client applications, wherein each user interaction message is in respect of a user interaction performed at one of the one or more participant client applications during the presentation session;
    for each user interaction message received, writing a corresponding interaction record to an in-memory database transaction log;
    over the course of the presentation session, periodically performing a presenter polling process, each presenter polling process comprising:
      retrieving new user interaction records from the in-memory database transaction log, wherein the new interaction records are interaction records that have been written to the in-memory database transaction log since performance of a previous presenter polling process; and
      communicating the new user interaction records retrieved from the in-memory database transaction log to a presenter client application.

12. The computer processing system according to claim 11, further comprising establishing a presenter data streaming connection with the presenter client application, and wherein in each presenter polling process the new user interaction records are communicated to the presenter client application over the presenter data streaming connection.

13. The computer processing system according to claim 12, further comprising establishing a presenter sink, and wherein in each presenter polling process:
  the new user interaction records retrieved from the in-memory database transaction log are added to the presenter sink; and
  the presenter data streaming connection is configured to stream interaction records added to the sink to the presenter's client application.

14. The computer processing system according to claim 11, wherein each presenter polling process further comprises:
  determining an active participant count; and
  communicating the active participant count to the presenter client application.

15. The computer processing system according to claim 11, further comprising:
  over the course of the presentation session, periodically receiving participant status messages, each participant status message being received from a participant client application and having an associated participant identifier; and
  for each participant status message received, updating participant data maintained in an in-memory database participant data structure.

16. The computer processing system according to claim 11, further comprising:
  determining the presentation session has ended; and
  in response to determining that the presentation session has ended:
    retrieving interaction data from the in-memory database, the interaction data comprising all interaction records stored in the in-memory database transaction log that are associated with the presentation session;
    storing the interaction data in persistent storage; and
    deleting all interaction records associated with the presentation session from the in-memory database transaction log.

17. The computer processing system according to claim 11, wherein each user interaction message defines an interaction type.

18. The computer processing system according to claim 17, wherein a given interaction message may define an interaction type selected from a group comprising: an add-comment type interaction; a remove-comment type interaction; an add-reaction type interaction; a remove-reaction type interaction; an add-poll response type interaction; a remove- poll response type interaction.

19. The computer processing system according to claim 11, wherein user interaction messages from a given participant client application are received over a participant streaming data connection established with the given participant client application.

20. A non-transient storage medium readable by a processor, the storage medium storing instructions executable by one or more processors to cause the one or more processors to perform a method for providing participant interactions in a presentation session, the method comprising:
  receiving, over the course of the presentation session, a plurality of a-user interaction messages from one or more participant client applications, wherein each user interaction message is in respect of a user interaction performed at one of the one or more participant client applications during the presentation session;

for each user interaction message received, writing a corresponding interaction record to an in-memory database transaction log;

over the course of the presentation session, periodically performing a presenter polling process, each presenter polling process comprising:

retrieving new user interaction records from the in-memory database transaction log, wherein the new interaction records are interaction records that have been written to the in-memory database transaction log since performance of a previous presenter polling process; and communicating the new user interaction records retrieved from the in-memory database transaction log to a presenter client application.

* * * * *